(12) United States Patent
Schuehmacher et al.

(10) Patent No.: US 12,258,916 B2
(45) Date of Patent: Mar. 25, 2025

(54) ENGINE ASSEMBLY AND METHOD FOR CONTROLLING AN ENGINE

(71) Applicant: BOMBARDIER RECREATIONAL PRODUCTS INC., Valcourt (CA)

(72) Inventors: Bruno Schuehmacher, Richmond (CA); Luc Champigny, Racine (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/583,613

(22) Filed: Feb. 21, 2024

(65) Prior Publication Data

US 2024/0191664 A1 Jun. 13, 2024

Related U.S. Application Data

(60) Continuation of application No. 17/691,666, filed on Mar. 10, 2022, now Pat. No. 11,913,390, which is a
(Continued)

(51) Int. Cl.
*F02D 41/00* (2006.01)
*F02B 37/18* (2006.01)
(Continued)

(52) U.S. Cl.
CPC ........ *F02D 41/0007* (2013.01); *F02B 37/183* (2013.01); *F02B 2075/025* (2013.01);
(Continued)

(58) Field of Classification Search
CPC .............. F02B 37/173; F02B 2075/025; F02D 41/0007; F02D 41/1446; F02D 2200/0404; F02D 2200/10; F02D 2200/101
See application file for complete search history.

(56) References Cited

U.S. PATENT DOCUMENTS 4,509,331 A 4/1985 Hirabayashi
6,237,566 B1 5/2001 Spaulding
(Continued)

FOREIGN PATENT DOCUMENTS

DE 102020129001 A1 5/2022
DE 102021002863 A1 12/2022
(Continued)

OTHER PUBLICATIONS

International Search Report of PCT/IB2020/058101; Blaine R. Copenheaver; Mar. 25, 2021.
(Continued)

*Primary Examiner* — Ngoc T Nguyen
(74) *Attorney, Agent, or Firm* — BCF LLP

(57) ABSTRACT

A method for controlling a two-stroke engine operatively connected to a turbocharger, the turbocharger being in fluid communication with the engine to provide a boost pressure thereto. The method includes determining an exhaust temperature representative of an actual temperature of exhaust gas being discharged by the engine; determining a temperature difference between the exhaust temperature and a threshold temperature; in response to the exhaust temperature being less than the corresponding threshold value: determining a corrective amount of boost pressure to add to the boost pressure of the turbocharger, the corrective amount of boost pressure being determined based on the temperature difference; and controlling the turbocharger to increase the boost pressure of the turbocharger by the corrective amount.

16 Claims, 28 Drawing Sheets

Related U.S. Application Data division of application No. 17/639,140, filed as application No. PCT/IB2020/058101 on Aug. 31, 2020, now Pat. No. 11,905,905.

(60) Provisional application No. 62/959,586, filed on Jan. 10, 2020, provisional application No. 62/893,916, filed on Aug. 30, 2019.

(51) Int. Cl.
  *F02D 41/14* (2006.01)
  *F02B 75/02* (2006.01)
  *F02M 35/10* (2006.01)

(52) U.S. Cl.
  CPC .. *F02D 41/1446* (2013.01); *F02D 2200/0404* (2013.01); *F02D 2200/10* (2013.01); *F02D 2200/101* (2013.01); *F02M 35/1019* (2013.01)

(56) References Cited

U.S. PATENT DOCUMENTS

| | | | |
|---|---|---|---|
| 6,371,082 | B1 | 4/2002 | Spaulding |
| 6,550,450 | B2 | 4/2003 | Spaulding |
| 6,876,917 | B1 | 4/2005 | Bates et al. |
| 6,951,203 | B2 | 10/2005 | Spaulding |
| 7,258,107 | B2 | 8/2007 | Johnson et al. |
| 10,865,700 | B2 | 12/2020 | Lefevbre et al. |
| 11,913,390 | B2 * | 2/2024 | Schuehmacher ... F02D 41/1448 |
| 2002/0065007 | A1 | 5/2002 | Yamazaki et al. |
| 2006/0236692 | A1 | 10/2006 | Kolavennu et al. |
| 2009/0132153 | A1 | 5/2009 | Shutty et al. |
| 2011/0010079 | A1 | 1/2011 | Shutty et al. |
| 2011/0154812 | A1 | 6/2011 | Butler |
| 2018/0245520 | A1 | 8/2018 | Nagar et al. |
| 2018/0266302 | A1 | 9/2018 | Kato et al. |
| 2020/0271046 | A1 | 8/2020 | Kelly et al. |
| 2021/0078674 | A1 | 3/2021 | Schuehmacher et al. |
| 2021/0131343 | A1 | 5/2021 | Bryant et al. |
| 2021/0131366 | A1 | 5/2021 | Blake et al. |
| 2021/0215093 | A1 | 7/2021 | Buchwitz et al. |

FOREIGN PATENT DOCUMENTS

| | | |
|---|---|---|
| WO | 2014005130 A2 | 1/2014 |
| WO | 2019229240 A1 | 12/2019 |

OTHER PUBLICATIONS

Nice, "How Turbochargers Work", howstuffworks.com, retrieved from https://web.archive.org/web/20030402133521/http://auto.howstuffworks.com:80/turbo.htm on Jul. 15, 2023.

EPI Inc., Power and Torque: Understanding the Relationship Between the Two, Apr. 3, 2008, downloaded from https://web.archive.org/web/20080404020314/http://www.epi-eng.com/piston_engine_technology/power_and_torque.htm on Apr. 17, 2023.

Office Action issued from the USPTO on Mar. 30, 2023 in connection with the U.S. Appl. No. 17/639,140 and including PTO-892 Form.

* cited by examiner

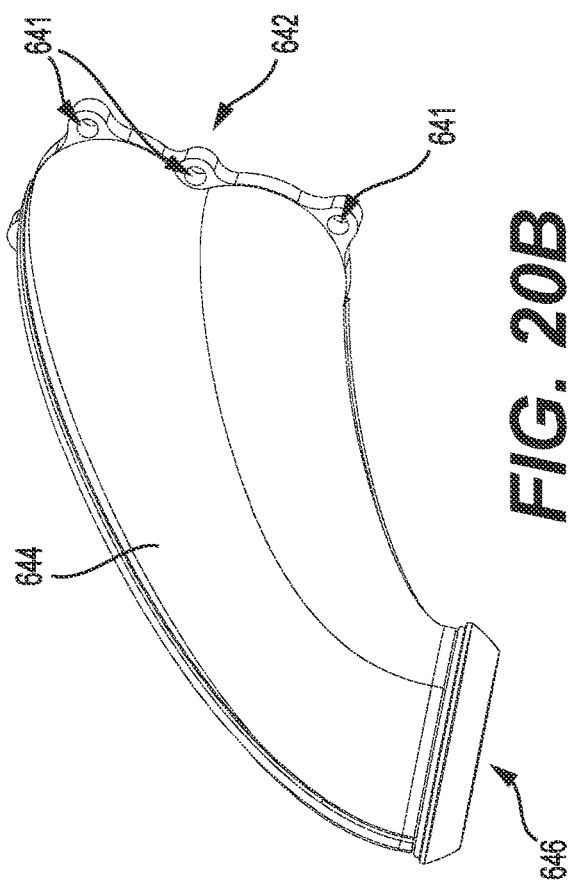
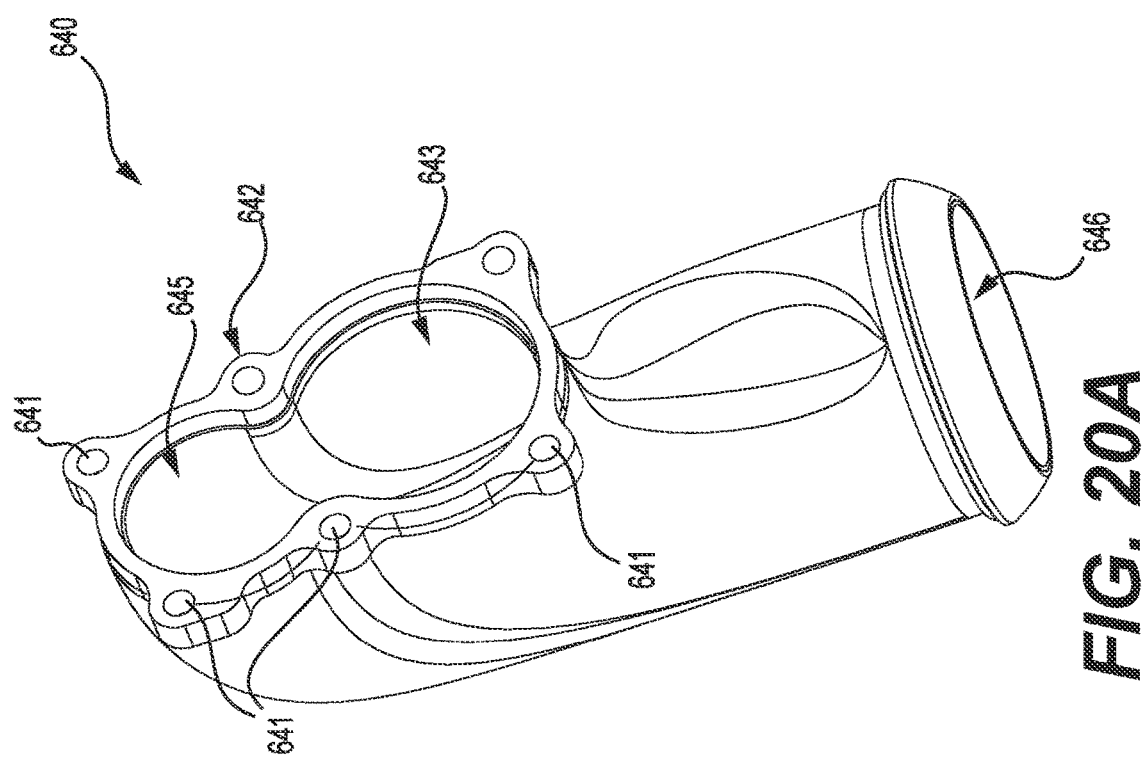

560

| y/x | 120 | 150 | 180 | 200 | 240 | ... |
|-----|-----|-----|-----|-----|-----|-----|
| 4.7 | 500 | 400 | 300 | 150 | 5   | ... |
| 6.7 | 200 | 180 | 120 | 50  | 2   | ... |
| 7.6 | 20  | 15  | 10  | 7   | 1   | ... |
| 8.5 | ... | ... | ... | ... | ... | ... |
| ... | ... | ... | ... | ... | ... | ... |

Rows labeled TPS; columns labeled EXHAUST GAS TEMPERATURE (°C); values are BOOST TARGET PRESSURE CORRECTION FACTOR (mbar).

FIG. 27

ENGINE ASSEMBLY AND METHOD FOR CONTROLLING AN ENGINE

CROSS-REFERENCE

The present application is a continuation application of U.S. patent application Ser. No. 17/691,666, filed on Mar. 10, 2022, which is a divisional of U.S. patent application Ser. No. 17/639,140, filed on Feb. 28, 2022, which is a national phase entry of PCT Patent Application No. PCT/IB2020/058101, filed on Aug. 31, 2020, which claims priority from U.S. Provisional Patent Application No. 62/959,586, filed on Jan. 10, 2020, and from U.S. Provisional Patent Application No. 62/893,916, filed on Aug. 30, 2019, the entire of each of which is incorporated herein by reference.

FIELD OF THE TECHNOLOGY

The present technology relates to engine assemblies and methods for controlling an engine.

BACKGROUND

For internal combustion engines, such as those used in snowmobiles, the efficiency of the combustion process can be increased by compressing the air entering the engine. This can be accomplished using a turbocharger connected to the air intake and exhaust systems of the snowmobiles. The compression of the air by the turbocharger may be of particular importance when the internal combustion engine is operated in environments where atmospheric pressure is low or when the air gets thinner, such as when the engine is operated at high altitudes.

The efficiency and the performance of some engines, especially two-stroke engines, may however be hindered in certain circumstances by the presence of a turbocharger because of an increased amount of back pressure caused by the turbocharger. Two-stroke engines tend to be especially sensitive to non-optimal levels of back pressure.

Furthermore, the engine's performance can be dependent on temperature of its exhaust gas. Notably, an engine operates optimally when the exhaust gas discharged thereby is at a given temperature range and thus the performance of the engine can be negatively affected when operating outside of that temperature range. In particular, when the exhaust gas being discharged by the engine is relatively cold, pressure waves traversing the tuned pipe are slower than that for which the tuned pipe was designed to handle during development. As the exhaust gas warms up (and thus the tuned pipe does as well), the speed of the pressure waves within the tuned pipe increases and, when the temperature of the exhaust gas reaches its optimal range of values for which the tuned pipe was designed, the speed of the pressure waves within the tuned pipe is the same as that used during calibration and therefore the engine begins operating optimally.

However, there is a significant loss of power of the engine during the "heat-up period" in which the temperature of the exhaust gas discharged by the engine has not yet reached its optimal range of values for which the tuned pipe was calibrated. In order to avoid this power loss, in some cases it has been proposed to retard the timing of the engine. However, this solution is applicable in a racing environment and not for standard use of snowmobiles, and moreover requires the snowmobile to be stationary.

There is thus a need for an engine assembly and a method for controlling an engine that addresses at least in part some of these drawbacks.

SUMMARY

It is an object of the present technology to ameliorate at least some of the inconveniences present in the prior art.

According to one aspect of the present technology, there is provided a method for controlling a two-stroke engine operatively connected to a turbocharger, the turbocharger being in fluid communication with the engine to provide a boost pressure thereto, the method including determining an exhaust temperature representative of an actual temperature of exhaust gas being discharged by the engine; determining a temperature difference between the exhaust temperature and a threshold temperature; in response to the exhaust temperature being less than the corresponding threshold value: determining a corrective amount of boost pressure to add to the boost pressure of the turbocharger, the corrective amount of boost pressure being determined based on the temperature difference; and controlling the turbocharger to increase the boost pressure of the turbocharger by the corrective amount.

In some embodiments, determining the corrective amount of boost pressure comprising selecting a magnitude of the corrective amount of boost pressure corresponding to a magnitude of the temperature difference, with greater magnitudes of boost pressure being chosen in response to greater temperature differences.

In some embodiments, controlling the turbocharger to increase the boost pressure of the turbocharger by the corrective amount increases an actual power output to or above a corresponding power output threshold value.

In some embodiments, the method further includes determining an actual power output of the engine, the corrective amount of boost pressure being further determined based on a comparison of the actual power output of the engine and a corresponding threshold thereof.

In some embodiments, determining the actual power output of the engine includes determining a rotational speed of the engine; determining a torque output of the engine; and calculating the actual power output of the engine based at least in part on the rotational speed of the engine and the torque output of the engine.

In some embodiments, controlling the turbocharger to increase the boost pressure of the turbocharger includes actuating a valve disposed in a conduit of an exhaust system fluidly connected to the engine based at least in part on the corrective amount, the valve being configured to selectively divert exhaust gas away from the turbocharger.

In some embodiments, determining the exhaust temperature comprises sensing a temperature within an exhaust pipe of the engine.

In some embodiments, determining the exhaust temperature comprises sensing a temperature of a surface of an exhaust pipe of the engine.

In some embodiments, the corresponding threshold value of the exhaust temperature is less than or equal to 250° C.

In some embodiments, the corresponding threshold value of the exhaust temperature is between 150° C. and 250° C. inclusively.

In some embodiments, the corresponding threshold value of the exhaust temperature is approximately 200° C.

In some embodiments, determining the corrective amount of boost pressure includes accessing a predefined dataset; and retrieving the corrective amount of boost pressure from the predefined dataset based on the exhaust temperature and a throttle position of a throttle valve regulating air flow into the engine.

According to another aspect of the present technology, there is provided a method for controlling a two-stroke engine operatively connected to a turbocharger, the turbocharger being in fluid communication with the engine to provide a boost pressure thereto, the method including determining an exhaust temperature representative of an actual temperature of exhaust gas being discharged by the engine; in response to the exhaust temperature being less than a corresponding threshold value by a first value: controlling the turbocharger to increase the boost pressure of the turbocharger by a first amount which would cause the engine to output a threshold engine power output; in response to the exhaust temperature being less than a corresponding threshold value by a second value, the second value being greater than the first value: controlling the turbocharger to increase the boost pressure of the turbocharger by a second first amount, greater than the first amount, which would cause the engine to output the threshold engine power output.

In some embodiments, the method further includes determining an actual power output of the engine, a corrective amount of boost pressure is further determined based on a comparison of the actual power output of the engine and a corresponding threshold thereof.

In some embodiments, determining the actual power output of the engine includes determining a rotational speed of the engine; determining a torque output of the engine; and calculating the actual power output of the engine based at least in part on the rotational speed of the engine and the torque output of the engine.

In some embodiments, controlling the turbocharger to increase the boost pressure of the turbocharger includes actuating a valve disposed in a conduit of an exhaust system fluidly connected to the engine based at least in part on the corrective amount, the valve being configured to selectively divert exhaust gas away from the turbocharger.

According to another aspect of the present technology, there is provided an engine assembly. The engine assembly includes: a two-stroke internal combustion engine; a turbocharger operatively connected to the engine, the turbocharger comprising a compressor and an exhaust turbine; an intake pipe fluidly connected to the engine and to the compressor of the turbocharger; an exhaust tuned pipe fluidly connected to the engine and to the exhaust turbine of the turbocharger; a temperature sensor configured to generate a signal representative of a temperature of exhaust gas flowing within the exhaust tuned pipe; and a controller. The controller is configured to: determine a boost target pressure of the turbocharger based in part on the signal generated by the temperature sensor; and control the turbocharger to provide the boost target pressure to the engine.

In some embodiments, the engine assembly also includes: a bypass conduit fluidly connected to the turbocharger and to the exhaust tuned pipe, the bypass conduit being positioned to receive exhaust gas from the engine through the exhaust tuned pipe, the bypass conduit being shaped to direct exhaust gas entering through an inlet thereof either into the exhaust turbine or bypassing the exhaust turbine; and a valve disposed in the bypass conduit and configured to selectively divert exhaust gas away from the exhaust turbine of the turbocharger. The controller is configured to actuate the valve in order to control the turbocharger.

In some embodiments, the temperature sensor is positioned at least in part within the tuned pipe.

In some embodiments, the temperature sensor is positioned on a surface of the tuned pipe.

In some embodiments, the engine assembly also includes: a throttle body in fluid communication with the engine; a throttle valve for regulating air flowing through the throttle body into the engine; and a throttle valve position sensor configured to sense a throttle position of the throttle valve. The controller is in communication with the throttle valve position sensor. The controller determines the boost target pressure of the turbocharger based on the signal generated by the temperature sensor and the throttle position sensed by the throttle valve position sensor.

In some embodiments, the controller determines the boost target pressure of the turbocharger by: accessing a predetermined dataset; and retrieving a boost target pressure correction factor from the predetermined dataset based on the signal generated by the temperature sensor and the throttle position sensed by the throttle valve position sensor.

In some embodiments, the controller controls the turbocharger by increasing an actual boost pressure provided by the turbocharger to the engine in accordance with the boost target pressure correction factor retrieved from the predetermined dataset.

In some embodiments, a vehicle includes the engine assembly.

According to another aspect of the present technology, there is provided a method for controlling a two-stroke engine operatively connected to a turbocharger. The turbocharger is in fluid communication with the engine to provide a boost pressure thereto. The method includes: comparing one of (i) an actual power output of the engine; and (ii) an exhaust temperature representative of an actual temperature of exhaust gas being discharged by the engine, with a corresponding threshold value thereof; in response to the one of the actual power output of the engine and the exhaust temperature being less than the corresponding threshold value: determining a corrective amount of boost pressure to add to the boost pressure of the turbocharger; and controlling the turbocharger to increase the boost pressure of the turbocharger by the corrective amount.

In some embodiments, controlling the turbocharger to increase the boost pressure of the turbocharger by the corrective amount increases the one of the actual power output and the exhaust temperature to or above the corresponding threshold value.

In some embodiments, the method also includes determining the actual power output of the engine. The one of the actual power output of the engine and the exhaust temperature is the actual power output of the engine.

In some embodiments, the method also includes determining the exhaust temperature representative of the actual temperature of exhaust gas being discharged by the engine. The one of the actual power output of the engine and the exhaust temperature is the exhaust temperature.

In some embodiments, controlling the turbocharger to increase the boost pressure of the turbocharger includes: actuating a valve disposed in a conduit of an exhaust system fluidly connected to the engine based at least in part on the corrective amount, the valve being configured to selectively divert exhaust gas away from the turbocharger.

In some embodiments, determining the actual power output of the engine includes: determining a rotational speed of the engine; determining a torque output of the engine; and calculating the actual power output of the engine based at least in part on the rotational speed of the engine and the torque output of the engine.

In some embodiments, determining the exhaust temperature includes sensing a temperature within an exhaust pipe of the engine.

In some embodiments, determining the exhaust temperature comprises sensing a temperature of a surface of an exhaust pipe of the engine.

In some embodiments, determining the corrective amount of boost pressure includes: accessing a predefined dataset; and retrieving the corrective amount of boost pressure from the predefined dataset based on the exhaust temperature and a throttle position of a throttle valve regulating air flow into the engine.

According to another aspect of the present technology, there is provided a method for controlling a two-stroke engine operatively connected to a turbocharger. The turbocharger is in fluid communication with the engine to provide a boost pressure thereto. The method includes: determining a boost target pressure of the turbocharger; determining an exhaust temperature representative of a temperature of exhaust gas being discharged by the engine; determining a boost target pressure correction factor based at least in part on the exhaust temperature; and controlling the turbocharger to increase the boost target pressure of the turbocharger in accordance with the boost target pressure correction factor.

In some embodiments, the boost target pressure correction factor is determined based at least in part on: the exhaust temperature; and a throttle position of a throttle valve regulating air flow into the engine.

In some embodiments, determining the boost target pressure correction factor includes: accessing a predetermined dataset; and retrieving the boost target pressure correction factor from the predetermined dataset based on the throttle position and the exhaust temperature.

In some embodiments, the boost target pressure is determined based at least in part on: a throttle position of a throttle valve regulating air flow into the engine; and a rotational speed of the engine.

In some embodiments, determining the boost target pressure of the turbocharger includes: accessing a predetermined dataset; and retrieving the boost target pressure of the turbocharger from the predefined dataset based on the throttle position of the throttle valve and the rotational speed of the engine.

In some embodiments, controlling the turbocharger to increase the boost target pressure of the turbocharger includes: actuating a valve disposed in a conduit of an exhaust system fluidly connected to the engine based at least in part on the boost target pressure correction factor, the valve being configured to selectively divert exhaust gas away from the turbocharger.

For purposes of this application, terms related to spatial orientation such as forwardly, rearward, upwardly, downwardly, left, and right, are as they would normally be understood by a driver of the snowmobile sitting thereon in a normal riding position. Terms related to spatial orientation when describing or referring to components or sub-assemblies of the snowmobile, separately from the snowmobile, such as a heat exchanger for example, should be understood as they would be understood when these components or sub-assemblies are mounted to the snowmobile, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. The explanations provided above regarding the above terms take precedence over explanations of these terms that may be found in any one of the documents incorporated herein by reference.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 20A is a left side elevation view of the exhaust collector of FIG. 12, shown in isolation;

FIG. 20B is a top, right side perspective view of the exhaust collector of FIG. 20A;

FIG. 27 illustrates an example dataset for use in the method of FIG. 26.

It should be noted that the Figures may not be drawn to scale, except where otherwise noted.

DETAILED DESCRIPTION

The present technology is described herein with respect to a snowmobile 10 having an internal combustion engine and two skis. However, it is contemplated that some aspects of the present technology may apply to other types of vehicles such as, but not limited to, snowmobiles with a single ski, road vehicles having two, three, or four wheels, off-road vehicles, all-terrain vehicles, side-by-side vehicles, and personal watercraft.

Figure 1:
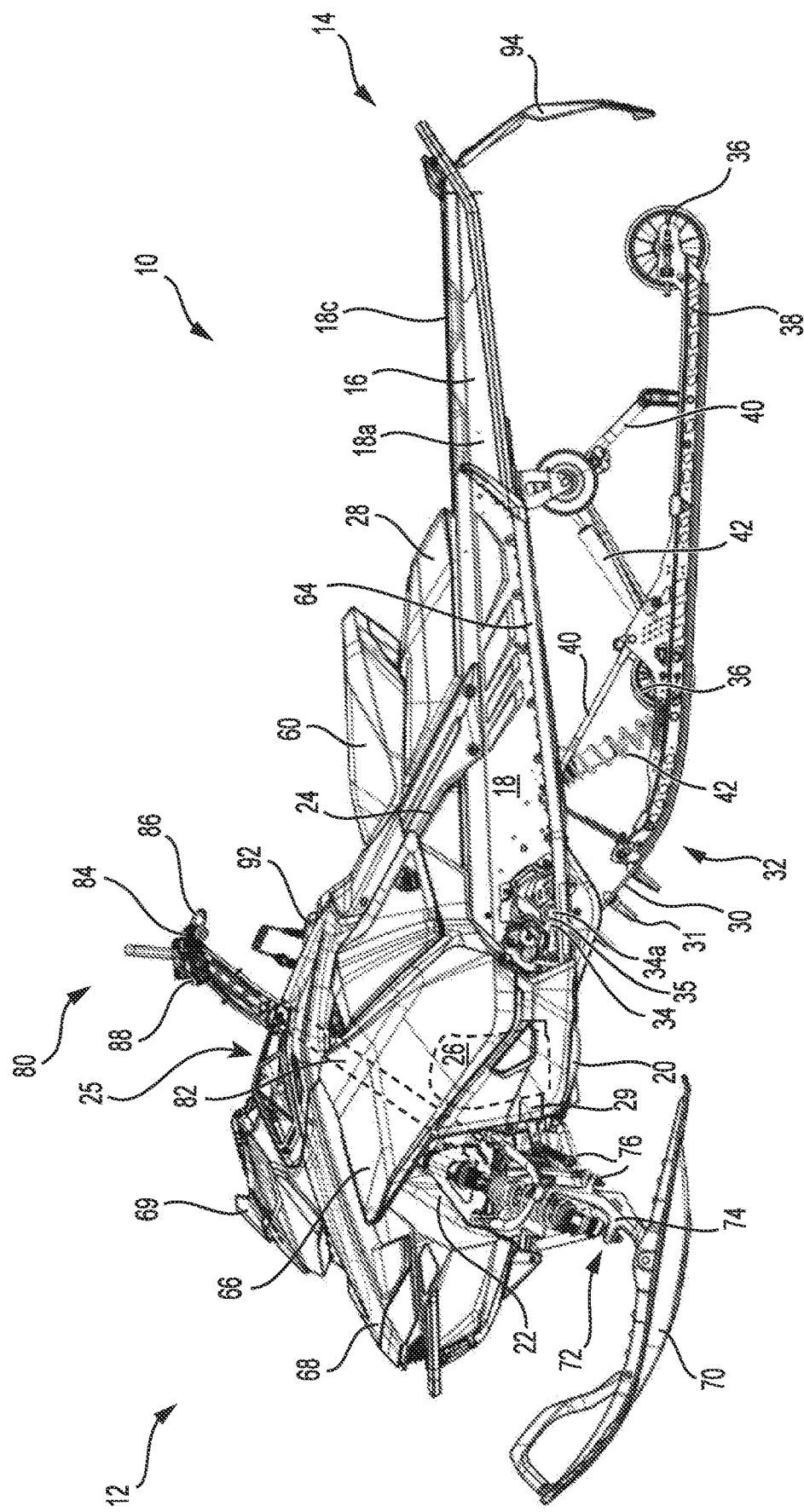
FIG. 1 is a left side elevation view of a snowmobile, with a portion of a drive track represented.
Figure 2:
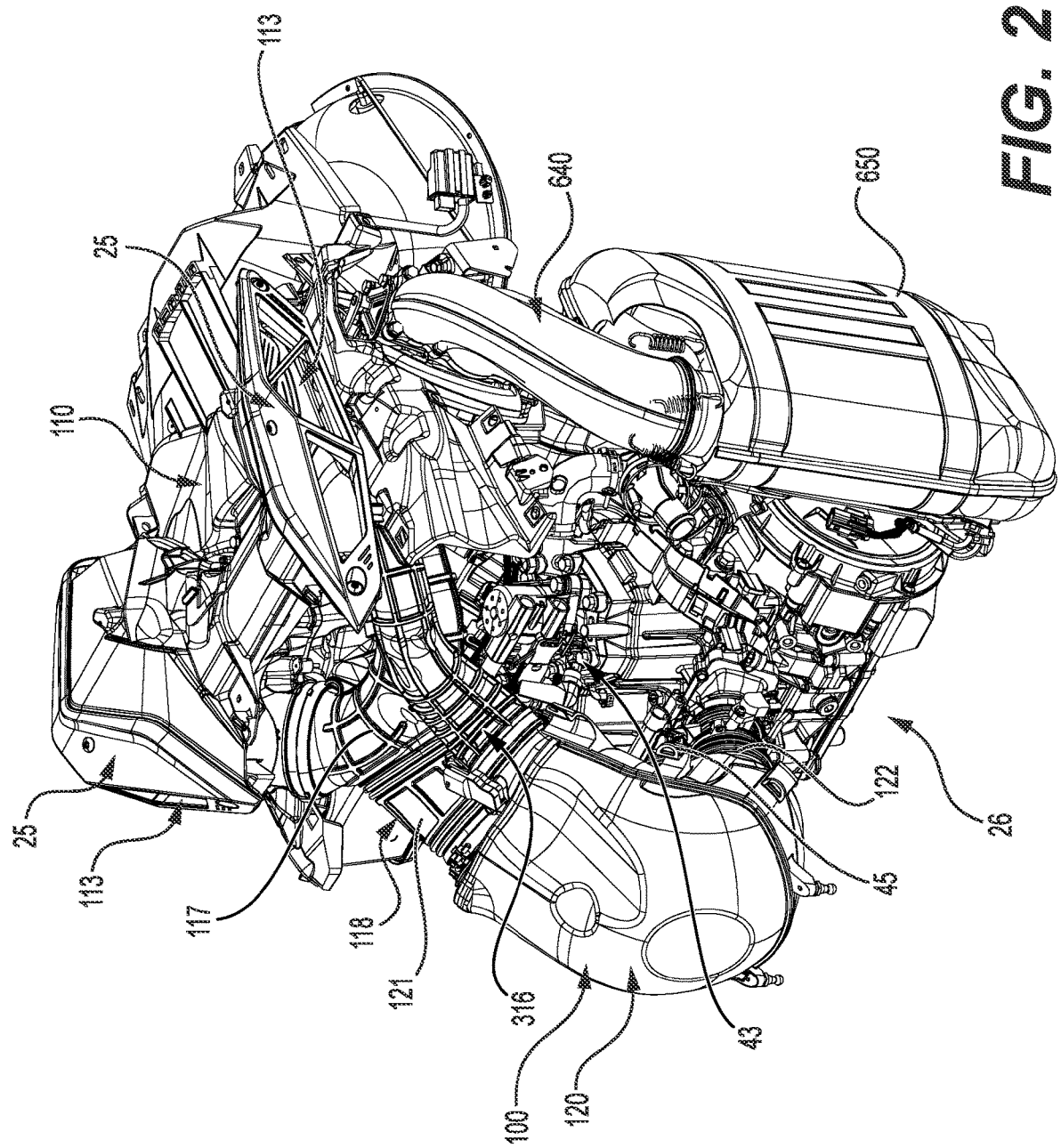
FIG. 2 is a top, rear, right side perspective view of an engine, air intake system and exhaust system of the snowmobile of FIG. 1.

With reference to FIGS. 1 and 2, a snowmobile 10 according to the present technology will be described. The snowmobile 10 includes a forward end 12 and a rearward end 14. The snowmobile 10 includes a vehicle body in the form of a frame or chassis 16 which includes a tunnel 18, an engine cradle portion 20, a front suspension module 22 and an upper structure 24.

An internal combustion engine 26 is carried in an engine compartment defined in part by the engine cradle portion 20 of the frame 16. A fuel tank 28, supported above the tunnel 18, supplies fuel to the engine 26 for its operation. The engine 26 receives air from an air intake system 100. The engine 26 and the air intake system 100 are described in more detail below.

An endless drive track 30 is positioned at the rear end 14 of the snowmobile 10. The drive track 30 is disposed generally under the tunnel 18, and is operatively connected to the engine 26 through a belt transmission system and a reduction drive. The endless drive track 30 is driven to run about a rear suspension assembly 32 operatively connected to the tunnel 18 for propulsion of the snowmobile 10. The endless drive track 30 has a plurality of lugs 31 extending from an outer surface thereof to provide traction to the track 30.

Figure 3:
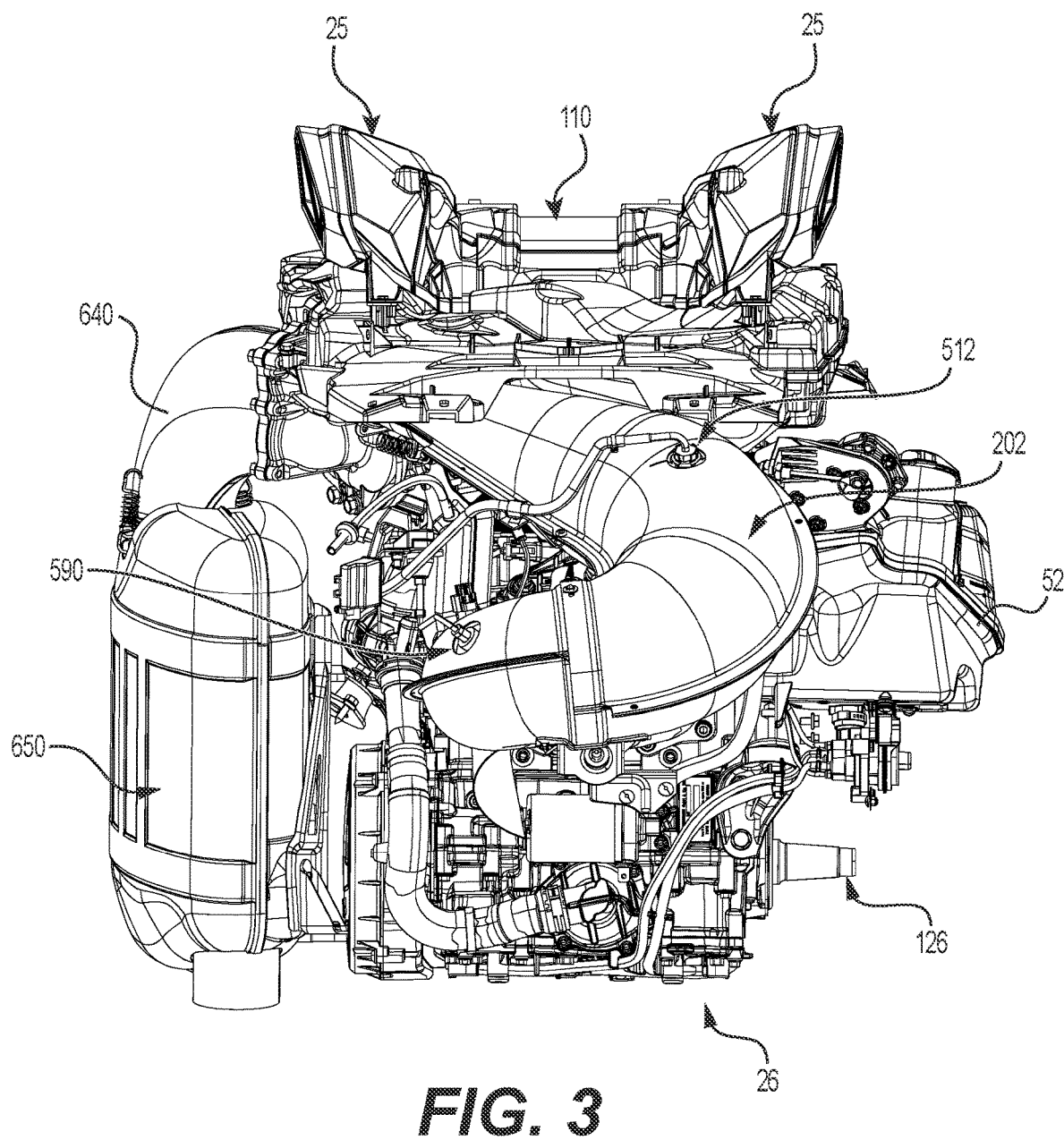
FIG. 3 is a front elevation view of the engine, air intake system and exhaust system of FIG. 2.

The rear suspension assembly 32 includes drive sprockets 34, idler wheels 36 and a pair of slide rails 38 in sliding contact with the endless drive track 30. The drive sprockets 34 are mounted on an axle 35 and define a sprocket axis 34a. The axle 35 is operatively connected to a crankshaft 126 (see FIG. 3) of the engine 26. The slide rails 38 are attached to the tunnel 18 by front and rear suspension arms 40 and shock absorbers 42. It is contemplated that the snowmobile 10 could be provided with a different implementation of a rear suspension assembly 32 than the one shown herein.

A straddle seat 60 is positioned atop the fuel tank 28. A fuel tank filler opening covered by a cap 92 is disposed on the upper surface of the fuel tank 28 in front of the seat 60. It is contemplated that the fuel tank filler opening could be disposed elsewhere on the fuel tank 28. The seat 60 is adapted to accommodate a driver of the snowmobile 10. The seat 60 could also be configured to accommodate a passenger. A footrest 64 is positioned on each side of the snowmobile 10 below the seat 60 to accommodate the driver's feet.

At the front end 12 of the snowmobile 10, fairings 66 enclose the engine 26 and the belt transmission system, thereby providing an external shell that not only protects the engine 26 and the transmission system, but can also make the snowmobile 10 more aesthetically pleasing. The fairings 66 include a hood 68 and one or more side panels which can be opened to allow access to the engine 26. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine cradle portion 20. The front suspension assembly 72 includes ski legs 74, supporting arms 76 and ball joints (not shown) for operatively connecting to the respective ski leg 74, supporting arms 76 and a steering column 82 (schematically illustrated).

A steering assembly 80, including the steering column 82 and a handlebar 84, is provided generally forward of the seat 60. The steering column 82 is rotatably connected to the frame 16. The lower end of the steering column 82 is connected to the ski legs 74 via steering rods (not shown). The handlebar 84 is attached to the upper end of the steering column 82. The handlebar 84 is positioned in front of the seat 60. The handlebar 84 is used to rotate the steering column 82, and thereby the skis 70, in order to steer the snowmobile 10. A throttle operator 86 in the form of a thumb-actuated throttle lever is mounted to the right side of the handlebar 84. Other types of throttle operators, such as a finger-actuated throttle lever and a twist grip, are also contemplated. A brake actuator 88, in the form of a hand brake lever, is provided on the left side of the handlebar 84 for braking the snowmobile 10 in a known manner. It is contemplated that the windshield 69 could be connected directly to the handlebar 84.

At the rear end of the snowmobile 10, a snow flap 94 extends downward from the rear end of the tunnel 18. The snow flap 94 protects against dirt and snow that can be projected upward from the drive track 30 when the snowmobile 10 is being propelled by the moving drive track 30. It is contemplated that the snow flap 94 could be omitted.

The snowmobile 10 includes other components such as a display cluster, and the like. As it is believed that these components would be readily recognized by one of ordinary skill in the art, further explanation and description of these components will not be provided herein.

With additional reference to FIGS. 2 to 6, the engine 26 and the air intake system 100 will be described in more detail. Air from the atmosphere flows through side apertures 113 defined in an upper portion 25 of the upper structure 24 of the chassis 16. The air then flows into a secondary airbox 110. The secondary airbox 110 is disposed above the front suspension module 22. A generally Y-shaped conduit 118 (FIG. 2) fluidly connects the secondary airbox 110, via a conduit portion 117, to an inlet 312 of an air compressor 310 (FIG. 5) disposed on the right side of the engine 26. The conduit 118 further fluidly connects to an inlet 119 of a primary airbox 120 via a conduit portion 121. The primary airbox 120 includes a bypass valve 123 (see FIGS. 35 and 36) controlling air flow through the inlet 119 into the primary airbox 120. It is contemplated that the secondary airbox 110 could be omitted and that air from the atmosphere could directly enter into the inlet 312 and/or the inlet 119 of the primary airbox 120 without going through the secondary airbox 110.

Air from the atmosphere, passing through the secondary airbox 110 and into the air compressor 310 via the conduit 118 and inlet 312, is compressed by the air compressor 310. The compressed air then flows out of the air compressor 310 through an outlet 314, into a conduit 316 and into the primary air box 120. The primary airbox 120 is fluidly connected to the engine 26 via two air outlets 122 of the primary airbox 120 (see also FIG. 10). The bypass valve 123 of the primary airbox 120 is spring-loaded to a closed position, such that air is preferentially received from the air compressor 310 via the conduit 316. When the air pressure within the primary airbox 120 falls below a threshold value, for example when the engine 26 is rotating at a speed that requires more air then is available in the primary airbox 120, the valve 123 opens to allow air from the atmosphere, via the secondary airbox 110, to enter the primary airbox 120 directly.

In some situations, this can aid in obtaining optimal operation of the engine 26, especially when the turbocharger 300 is spooling and not supplying the necessary air flow to the primary airbox 120 for the air being requested by the engine 26. As shown in FIG. 35, valve 123 includes a spring 125. The spring constant of spring 125 is chosen such that valve 123 will open and close at a predetermined pressure within primary airbox 120. Thus once opened, the bypass valve 123 will automatically close when the airflow from the turbocharger 300 increases the pressure within the primary airbox 120 to the predetermined pressure, and vice versa. The diameter of valve 123 is sized to allow for a high flow capacity between the secondary and primary airboxes 110, 120. This aids in ensuring optimal pressure within primary airbox 120 and thus aids optimal engine performance in generally all situations even if turbocharger 300 is not spooled. The conduit portion 117 and the bypass valve 123 also reduce the air flow travel distance between the secondary airbox 110 and the primary airbox 120, when compared to the air flow travel distance through the conduit portion 121, the turbocharger 300 and the conduit 316. As such, depending on the air pressure within primary airbox 120, the airflow between the secondary and primary airboxes 110, 120 has either a short airflow path or a long airflow path available. Inclusion of the bypass valve 123 in the primary airbox 120 further allows the engine 26 to be operated in either a turbocharged mode or a naturally aspirated mode. Operation of the engine 26, and corresponding operation of the turbocharger 300, in order to operate in the two modes will be described in further detail below.

The engine 26 is an inline, two-cylinder, two-stroke, internal combustion engine. The two cylinders of the engine 26 are oriented with their cylindrical axes disposed vertically. It is contemplated that the engine 26 could be configured differently. For example, the engine 26 could have more or less than two cylinders, and the cylinders could be arranged in a V-configuration instead of in-line. It is contemplated that in some implementations the engine 26 could be a four-stroke internal combustion engine, a carbureted engine, or any other suitable engine capable of propelling the snowmobile 10.

Figure 4:
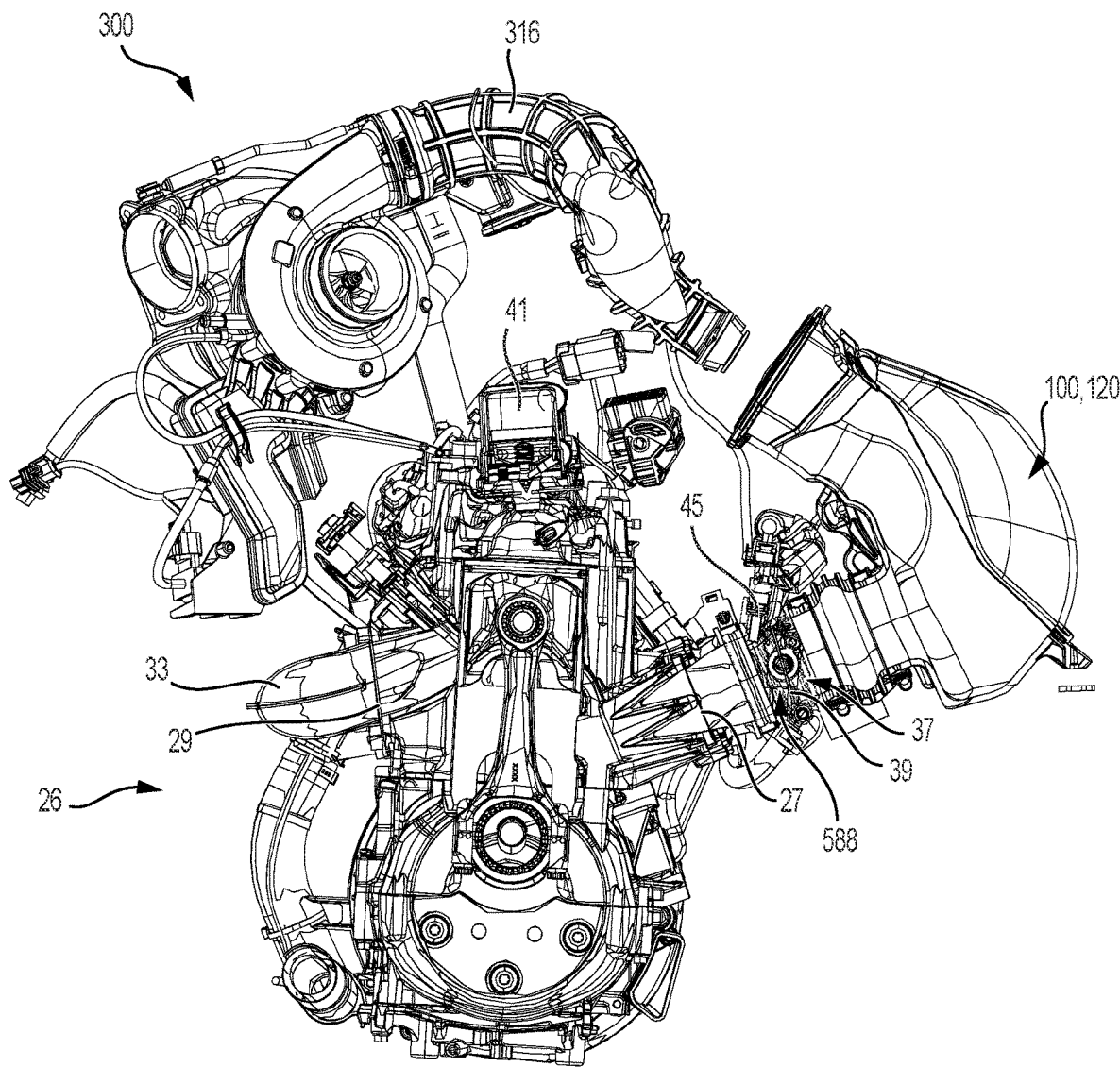
FIG. 4 is a cross-sectional view of the engine and some portions of the air intake system and the exhaust system of FIG. 2.

As shown in FIGS. 1, 2, and 4, the engine 26 receives air from the air intake system 100, specifically the outlets 122 of the primary airbox 120, via engine air inlets 27 defined in the rear portion of each cylinder of the engine 26. Each air inlet 27 is connected to a throttle body 37 of the air intake system 100. The throttle body 37 comprises a throttle valve 39 which rotates to regulate the amount of air flowing through the throttle body 37 into the corresponding cylinder of the engine 26. A throttle valve actuator (not shown) is operatively connected to the throttle valve 39 to change the position of the throttle valve 39 and thereby adjust the opening of the throttle valve 39 with operation of the throttle lever 86 on the handlebar 84. In the present implementation, the throttle valve actuator is a mechanical linkage, although this is simply one non-limiting implementation. The position and the movement of the throttle valve 39 is monitored by a throttle valve position sensor 588 (schematically illustrated in FIG. 8) operatively connected to the throttle valve 39, described in more detail below. It is also contemplated that the throttle valve actuator could be in the form of an electric motor. The electric motor could change the position of the throttle valve 39 based on input signals received from an electronic control module (not shown) which in turn receives inputs signals from a position sensor associated with the throttle lever 86 on the handlebars 84. Further details regarding such drive-by wire throttle systems can be found in International Patent Application No. PCT/US2013/048803 filed on Jun. 29, 2013, the entirety of which is incorporated herein by reference.

The engine 26 receives fuel from the fuel tank 28 via Direct Injection (DI) injectors 41 and Multi Point Fuel Injection (MPFI) injectors 45 (both shown in at least FIG. 4), having an opening in the cylinders. The fuel-air mixture in each of the left and right cylinders of the engine 26 is ignited by an ignition system including spark plugs 43 (best seen in FIG. 2). Engine output power, torque and engine speed are determined in part by throttle opening and in part by the ignition timing, and also by various characteristics of the fuel-air mixture such as its composition, temperature, pressure and the like.

Figure 5:
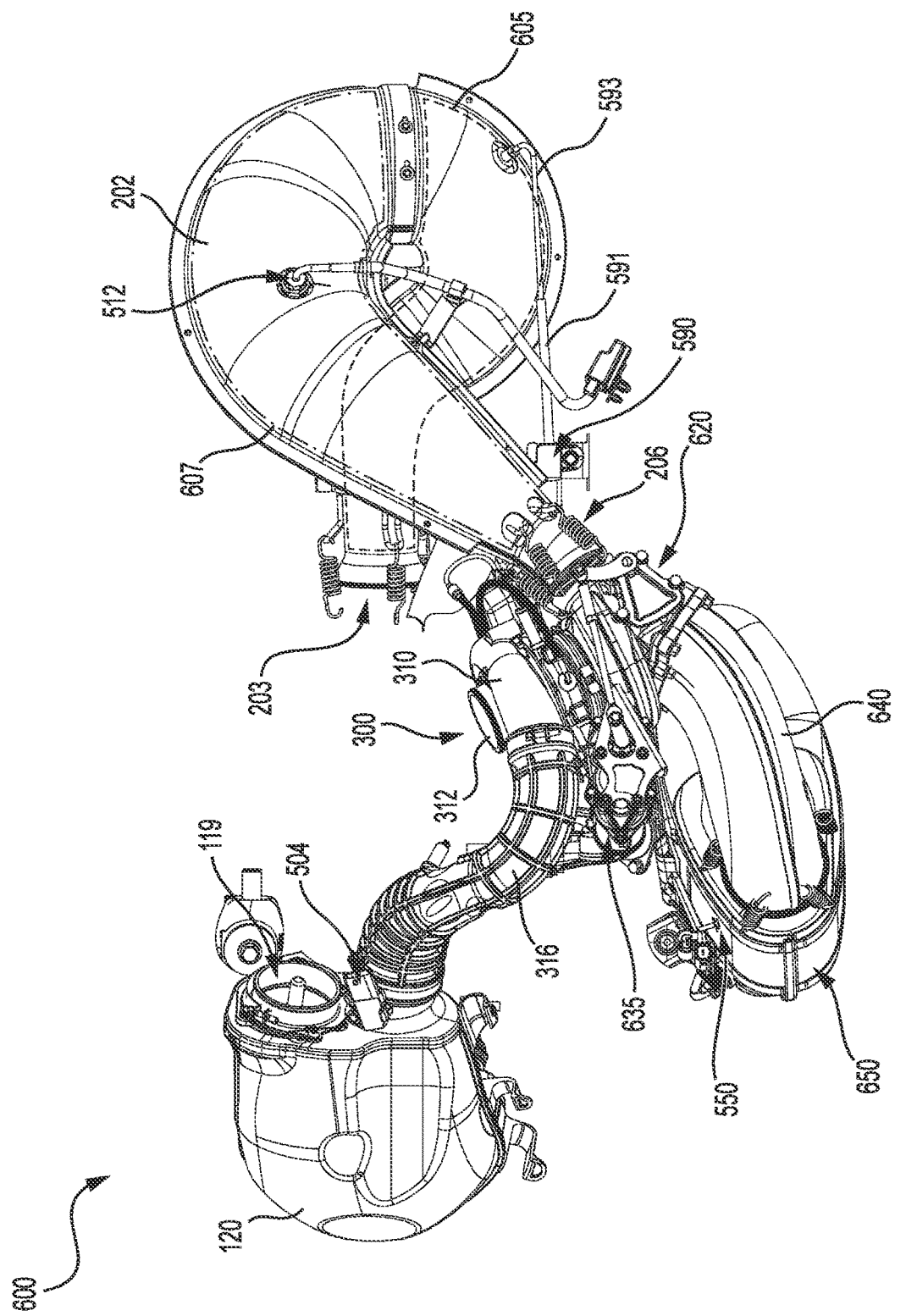
FIG. 5 is a top plan view of portions of the air intake system and the exhaust system of FIG. 2.

Exhaust gases resulting from the combustion events of the combustion process are expelled from the engine 26 via an exhaust system 600 (FIG. 5). As shown in FIG. 4, an exhaust outlet 29 is defined in the front portion of each cylinder of the engine 26. Each exhaust outlet 29 has an exhaust valve 129. The exhaust outlets 29 are fluidly connected to an exhaust manifold 33. The exhaust system 600 includes an exhaust pipe 202 which is connected to the exhaust manifold 33 and extends forwardly therefrom to direct the exhaust gases out of the engine 26.

In the present implementation, the exhaust pipe 202 is a tuned pipe which has a geometry suitable for improving efficiency of the engine 26.

Figure 6:
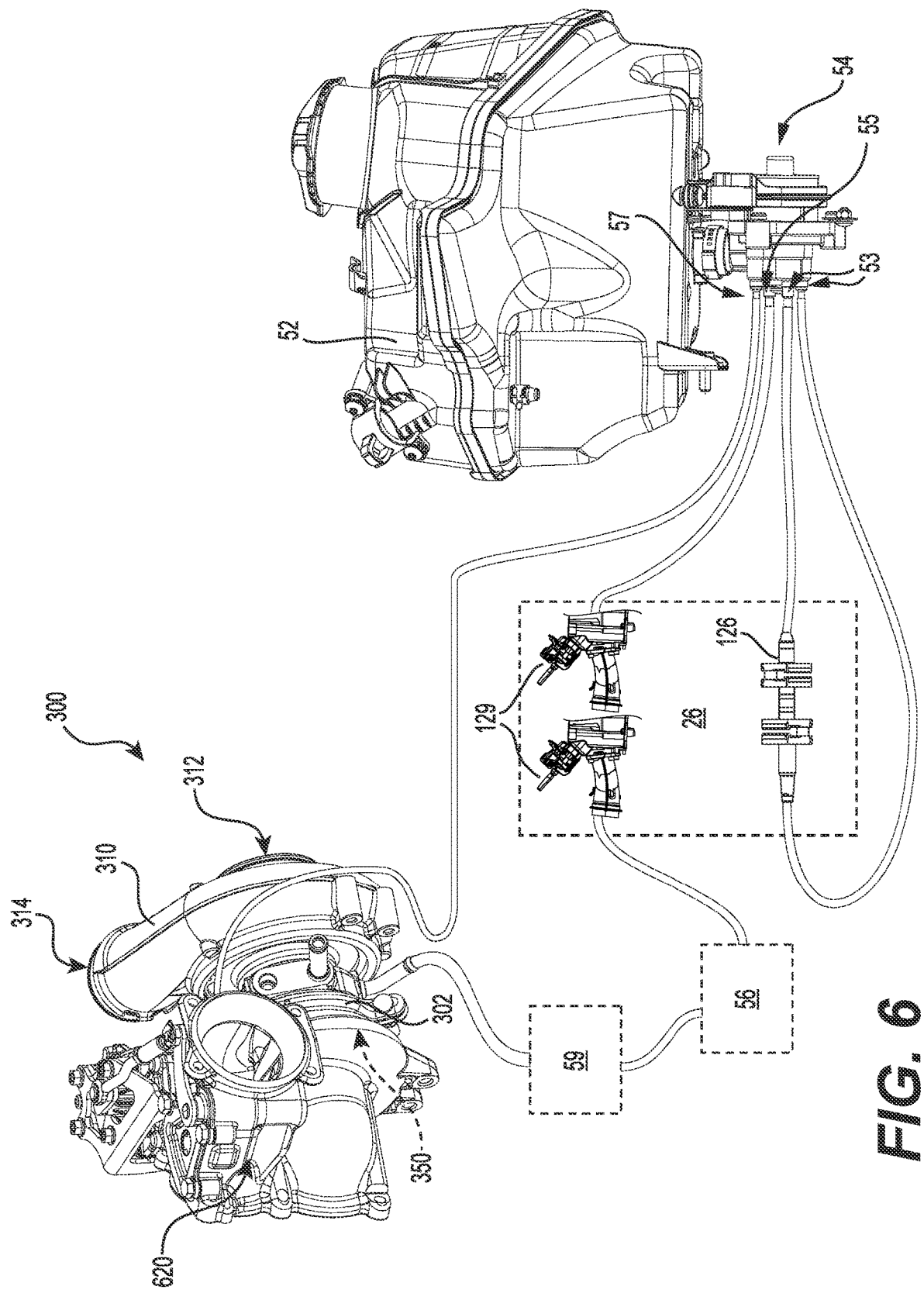
FIG. 6 is a schematic representation of a lubrication system of the snowmobile of FIG. 1.
Figure 12:
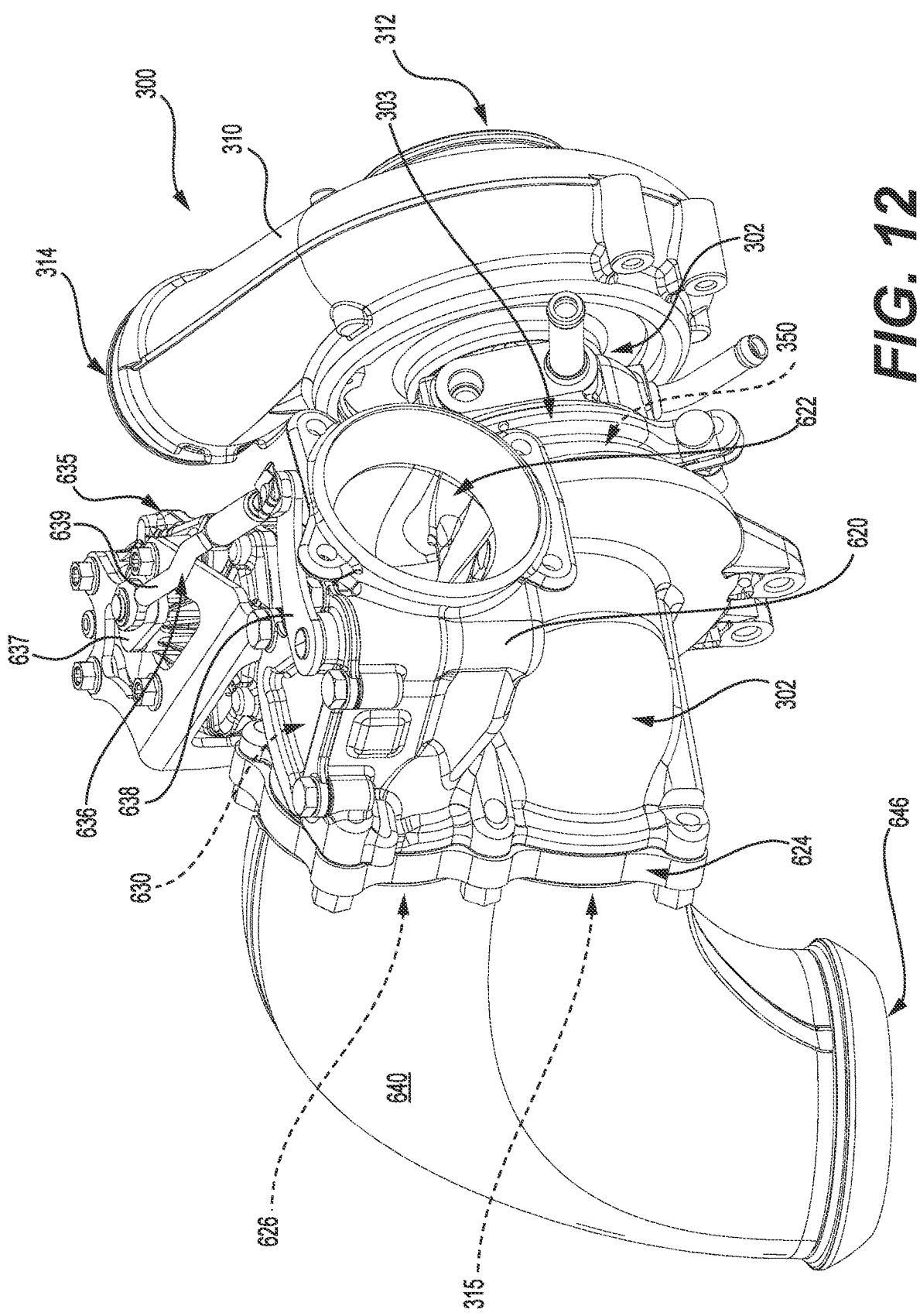
FIG. 12 is a front elevation view of a turbocharger, a bypass conduit, and an exhaust collector of the exhaust system of FIG. 2.
Figure 13:
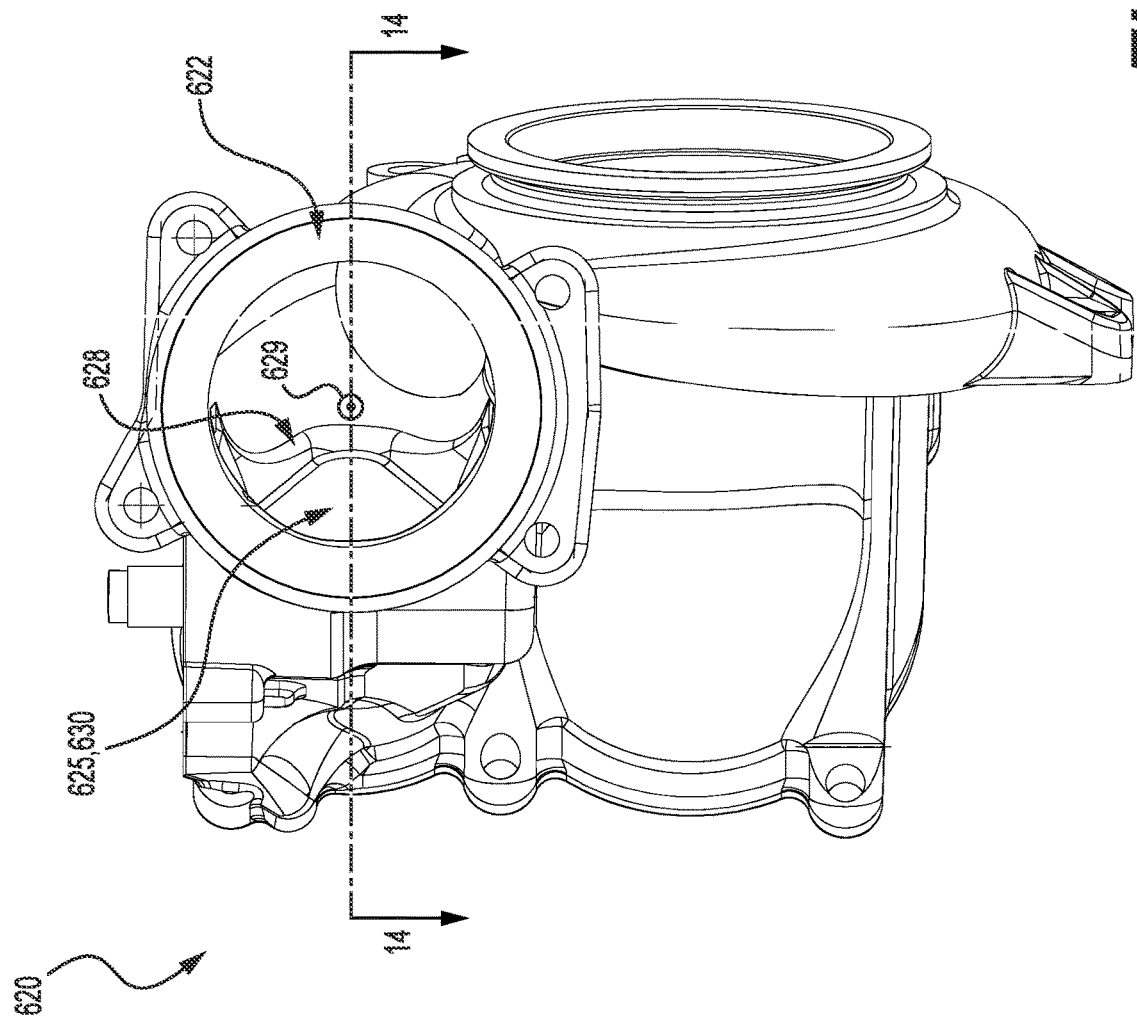
FIG. 13 is a perspective view of the bypass conduit of FIG. 12, shown in isolation.
Figure 19:
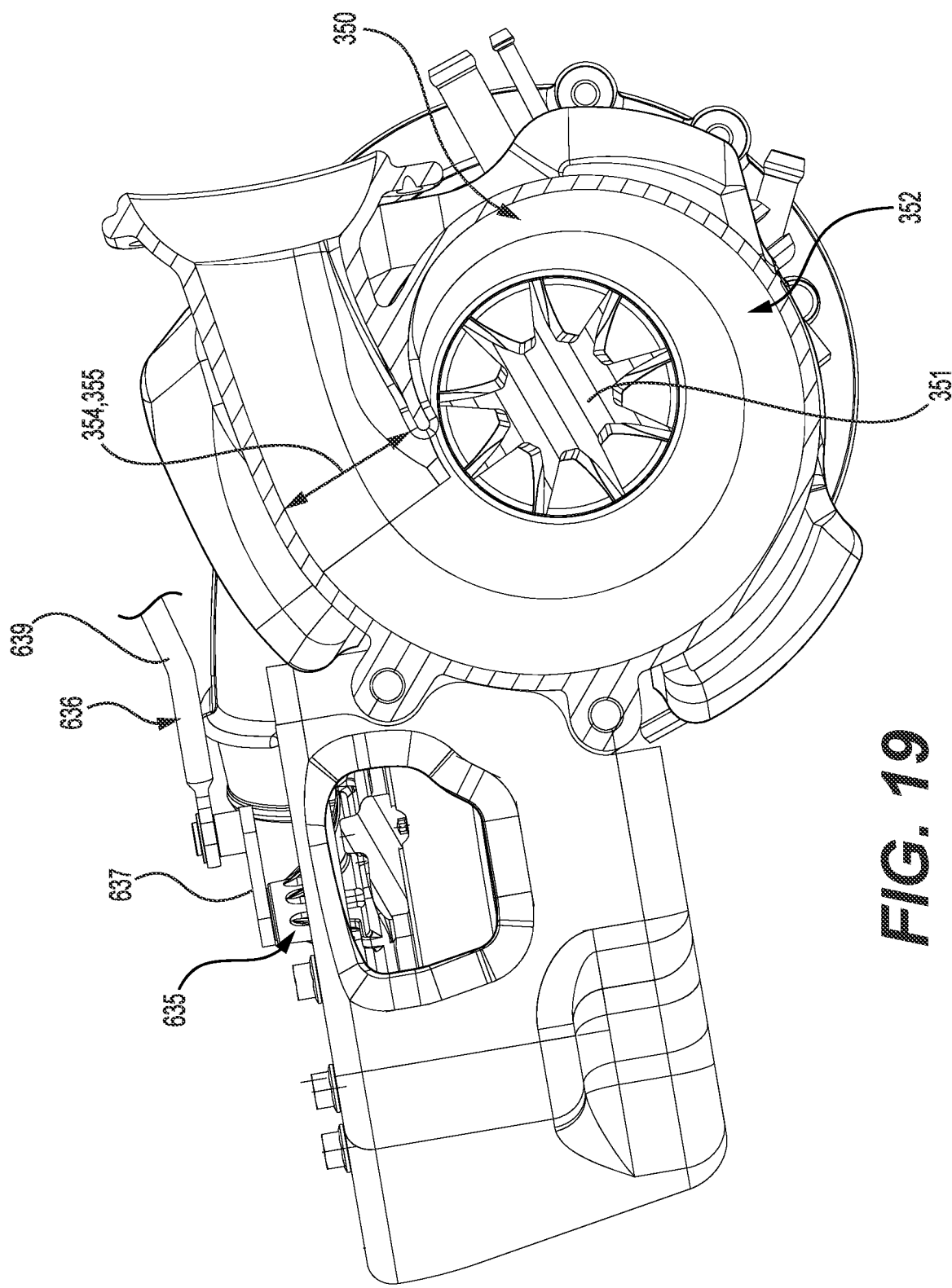
FIG. 19 is a cross-sectional view of the turbocharger of FIG. 18, taken along line 19-19 of FIG. 18.

A turbocharger 300 is operatively connected to the engine 26. The turbocharger 300 compresses air and feeds it to the engine 26. As shown in FIGS. 6 and 12, the turbocharger 300 has a housing 302 defining an air compressor 310 and an exhaust turbine 350. With additional reference to FIG. 19, the exhaust turbine 350 includes a turbine inlet 355 with an area 354, which is defined in turbochargers generally as the cross-sectional area of a volute 352 (measured at the tongue) of the exhaust turbine 350. The air compressor 310 includes a compressor wheel and is part of the air intake system 100. Intake air flowing past the rotating compressor wheel is compressed thereby, as described above. The rotation of the compressor wheel is powered by a turbine wheel 351 (FIG. 19) of the exhaust turbine 350, which is part of the exhaust system 600. The turbine wheel 351 is rotated by exhaust gases expelled from the engine 26 and directed to flow over the blades of the turbine wheel 351. It is contemplated that, in some implementations, the air compressor 310 could be a supercharger, in which the compressor wheel would be directly powered by the engine 26. The exhaust system 600 will be described in greater detail below.

Figure 7:
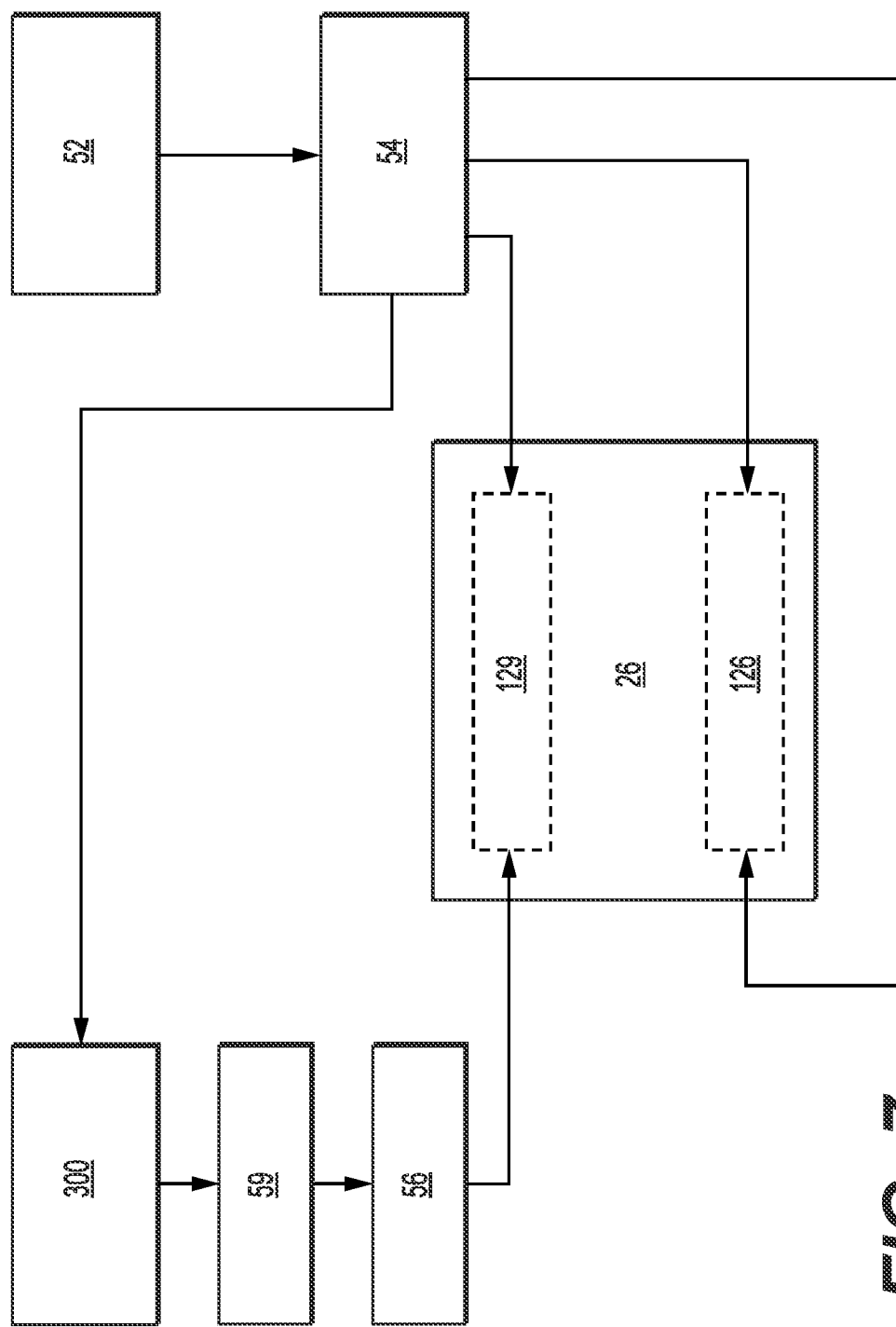
FIG. 7 is a schematic diagram of lubricating oil flow of the lubrication system of FIG. 6.

Referring to FIGS. 6 and 7, the snowmobile 10 further includes a lubrication system to provide lubricating oil to the engine 26 and to the turbocharger 300. The engine 26 is fluidly connected to an oil reservoir 52 which supplies oil to the crankshaft 126 and the exhaust valves 129 of the engine 26. The oil reservoir 52 is also fluidly connected to the turbocharger 300 to provide lubricating oil thereto. The turbocharger 300 is also fluidly connected to the engine 26, as will be described further below.

A primary oil pump 54 is fastened to and fluidly connected to the oil reservoir 52. It is contemplated that the pump 54 and the oil reservoir 52 could be differently connected together or could be disposed separately in the snowmobile 10. The primary oil pump 54 pumps oil from the reservoir 52 to the engine 26 and the turbocharger 300. The primary oil pump 54 includes four outlet ports for pumping out oil from the oil reservoir 52. Two outlet ports 53 supply oil to the crankshaft 126. Another outlet port 55 supplies oil to one of the exhaust valves 129. The fourth outlet port 57 supplies oil to the turbocharger 300. Depending on the implementation, it is contemplated that the primary oil pump 54 could include more or fewer outlet ports depending on specific details of the implementation.

A secondary oil pump 56 and an oil/vapor separator tank 59 are fluidly connected between the turbocharger 300 and the engine 26. The secondary oil pump 56 receives oil that has passed through the turbocharger 300, and pumps that oil to the other exhaust valve 129. FIG. 7 illustrates the flow directions of oil from the pumps 54, 56 and through the turbocharger 300 to the engine 26 via schematic diagram. It is further noted that in the present implementation, the turbocharger 300 is a ball-bearing based turbocharger 300 which is dimensioned for low oil flow lubrication in order to provide efficient responsiveness. It is contemplated that different types of turbochargers could be used in differed implementations.

With this configuration, only one oil reservoir 52 is utilized for lubricating both the turbocharger 300 and the engine 26. It is contemplated that the snowmobile 10 could also be arranged such that the secondary oil pump 56 could be omitted. It is also contemplated that oil could be circulated to the crankshaft 126, rather than the exhaust valves 129, after having passed through the turbocharger 300.

With additional reference to FIGS. 8 to 19, the exhaust system 600 will now be described in further detail. The exhaust gas expelled from the engine 26 flows through the exhaust outlets 29, through the exhaust manifold 33, and into the exhaust pipe 202, as is mentioned above. The exhaust pipe 202, also known as a tuned pipe 202, is curved and has a varying diameter along its length. Other types of exhaust pipes 202 are contemplated. As shown in FIG. 5, the exhaust pipe 202 includes a pipe inlet 203 fluidly connected to the exhaust manifold 33 and a pipe outlet 206 located at the end of the exhaust pipe 202. The exhaust pipe 202 further has a divergent portion 605 adjacent the pipe inlet 203 and a convergent portion 607 adjacent the pipe outlet 206. The pipe outlet 206 is positioned downstream from the pipe inlet 203. It is well known in the art of two stroke engines that the goal of the converging-diverging type tuned pipe is to have the diverging section create a returning rarefaction wave and the converging section create a returning pressure wave which pushes any excess fresh air-fuel mixture which flowed out of the cylinder into the exhaust pipe, back into the cylinder. Pushing the fresh mixture back into the cylinder is desired since this allows the returning pressure wave to "super charge" the cylinder giving it more fresh mixture than if the cylinder was filled at ambient pressure. The nomenclature "tuned pipe" is used because the dimensions of the pipe are specifically chosen so this super charging occurs within the pipe at a particular value of one or more parameters, or range of values thereof such as at a particular temperature and/or pressure, which coincide with a desired operating RPM or desired operating RPM range of the engine. Once the physical dimensions of the tuned pipe are selected, the super charging actions of that pipe will be optimal at the specific parameter values for which it was tuned and because conventional tuned pipes are fixed in dimension, these parameters are not adjustable during use of the vehicle in which the engine is installed. When the tuned pipe is not operating at these specific tuned parameter values, the super charging effect will be less than optimal and consequently the operation of the engine will be less than optimal at the desired operating RPM. For this reason, when the restrictions of a turbocharger or a variable valve such as the valve 630 are added along the flow path of the exhaust which causes the temperature and/or pressure to be changed within the tuned pipe at any given time of operation, compensations must be made in order to prevent these changes from negatively affecting engine performance or otherwise limit negative effects on engine performance. It should thus be understood that two stroke engines, due to this super charging action, are sensitive to variations within the tuned pipe.

The exhaust system 600 also includes a bypass conduit 620 to direct the flow of the exhaust gas to either bypass the turbocharger 300 or to pass through the exhaust turbine 350 of the turbocharger 300 to operate the air compressor 310. The pipe outlet 206 located at the end of the exhaust pipe 202 fluidly communicates with the bypass conduit 620. Specifically, the bypass conduit 620 defines an exhaust inlet 622 which is fluidly connected to the pipe outlet 206. The exhaust inlet 622 and the pipe outlet 206 are arranged such that exhaust gas passing from the pipe outlet 206 into the exhaust inlet 622 passes through the inlet 622 generally normal to the inlet 622. A central axis 629 (FIG. 13) of the exhaust inlet 622 illustrates the general direction of exhaust gas flow into the bypass conduit 620. In the present implementation, the central axis 629 coincides with the center of the circular inlet 622, but that may not always be the case.

The bypass conduit 620 is further fluidly connected to the housing 302 of the turbocharger 300. More specifically, the bypass conduit 620 is mechanically connected to the turbocharger housing 302 in the present implementation by a clamp 303. It is contemplated that the bypass conduit 620 could be an independent apparatus from the turbocharger 300. It is also contemplated that the bypass conduit 620 could be fastened or otherwise mechanically connected to the turbocharger housing 302. It is further contemplated that the bypass conduit 620 and the turbocharger housing 302 could be integrally formed.

Figure 14:
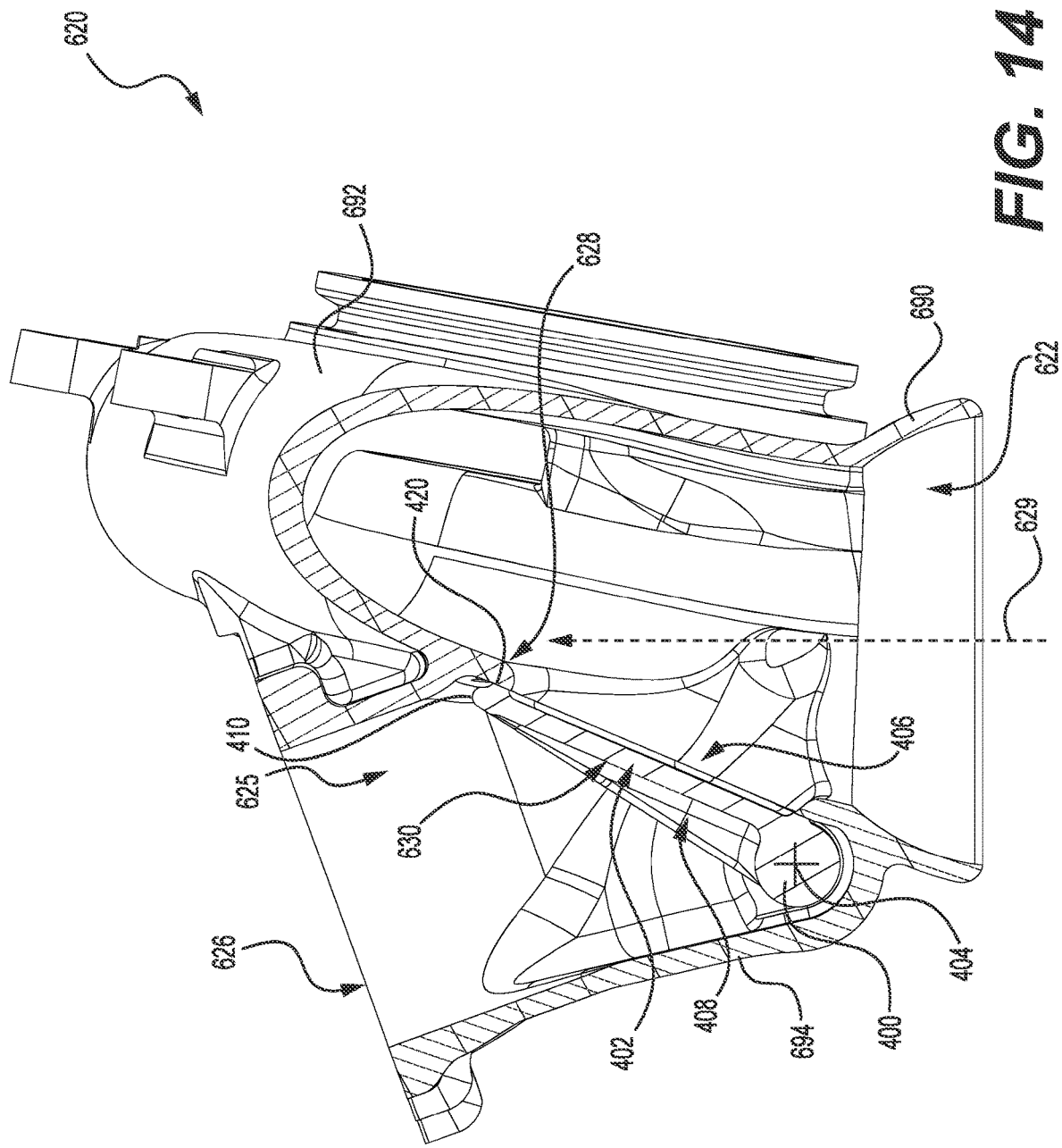
FIG. 14 is a cross-sectional view of the bypass conduit of FIG. 12, taken along line 14-14 of FIG. 13, with a valve in a closed position.

The bypass conduit 620 is generally Y-shaped, with an inlet conduit portion 690 extending from the exhaust inlet 622 and branching into two outlet conduit portions 692, 694 (FIG. 14). As such and as is mentioned above, the bypass conduit 620 serves to selectively direct the exhaust gas which enters through the exhaust inlet 622 either into the exhaust turbine 350 or bypassing the exhaust turbine 350. The turbine outlet portion 692 of the bypass conduit 620 (one branch of the Y-shape) fluidly communicates with the turbine inlet 355. A bypass outlet portion 694 (the other branch of the Y-shape) allows exhaust gas to bypass the turbocharger 300 to exit the bypass conduit 620 through a bypass outlet 626. The bypass outlet portion 694 defines a passage 625 which allows for fluid communication between the exhaust inlet 622 and the outlet 626. The outlet 626 and the passage 625 can be seen in FIG. 17. Best seen in FIG. 16, the bypass conduit 620 further includes a flow divider 628 disposed between the conduit portions 692, 694. The flow divider 628 aids in smoothly dividing the exhaust gas flow through the bypass conduit 620, in order to aid in avoiding flow separation or the creation of vortices in the exhaust gas flow. To that end, the flow divider 628 is generally shaped and arranged to avoid abrupt edges.

Flow of the exhaust gas through the passage 625 is selectively controlled by a valve 630 (FIGS. 14 to 16) disposed in the bypass conduit 620, in conjunction with a system controller 500 controlling the valve 630. More specifically, the valve 630 is a valve for selectively diverting exhaust gas away from the turbocharger 300. In the present implementation, the valve 630 is disposed in the passage 625, and more specifically at a valve seat 623 thereof. It is contemplated that the valve 630 could be disposed elsewhere in the bypass conduit 620, for example nearer the exhaust inlet 622 and just upstream from the passage 625, depending on the specific implementation of the valve 630. It is also contemplated that in some implementations, the valve 630 could selectively open or close the turbine outlet portion 692 rather than the bypass passage 625.

With reference to FIG. 12, an actuator 635 is operatively connected to the valve 630 to cause the valve 630 to pivot about a valve pivot axis 404 (shown in FIG. 14). In this implementation, the actuator 635 is a servomotor. It is contemplated that any other suitable type of actuator may be used in other implementations. The actuator 635 is connected to the valve 630 via a linkage assembly 636. More specifically, in this implementation, the linkage assembly 636 includes three arms 637, 638, 639. The arm 637 is connected to the actuator 635 and is rotatable thereby. The arm 638 is connected to an axle of the valve 630. The arm 639 is connected between the arms 637, 638. Rotation of the arm 637 therefore actuates the two other arms 638, 639 and causes the valve 630 to pivot between an open position, a closed position, and intermediate positions as will be described below. It is contemplated that, in some implementations, the valve 630 could rotate, translate, or be moved otherwise to control exhaust gas flow through the passage 625.

Figure 15:
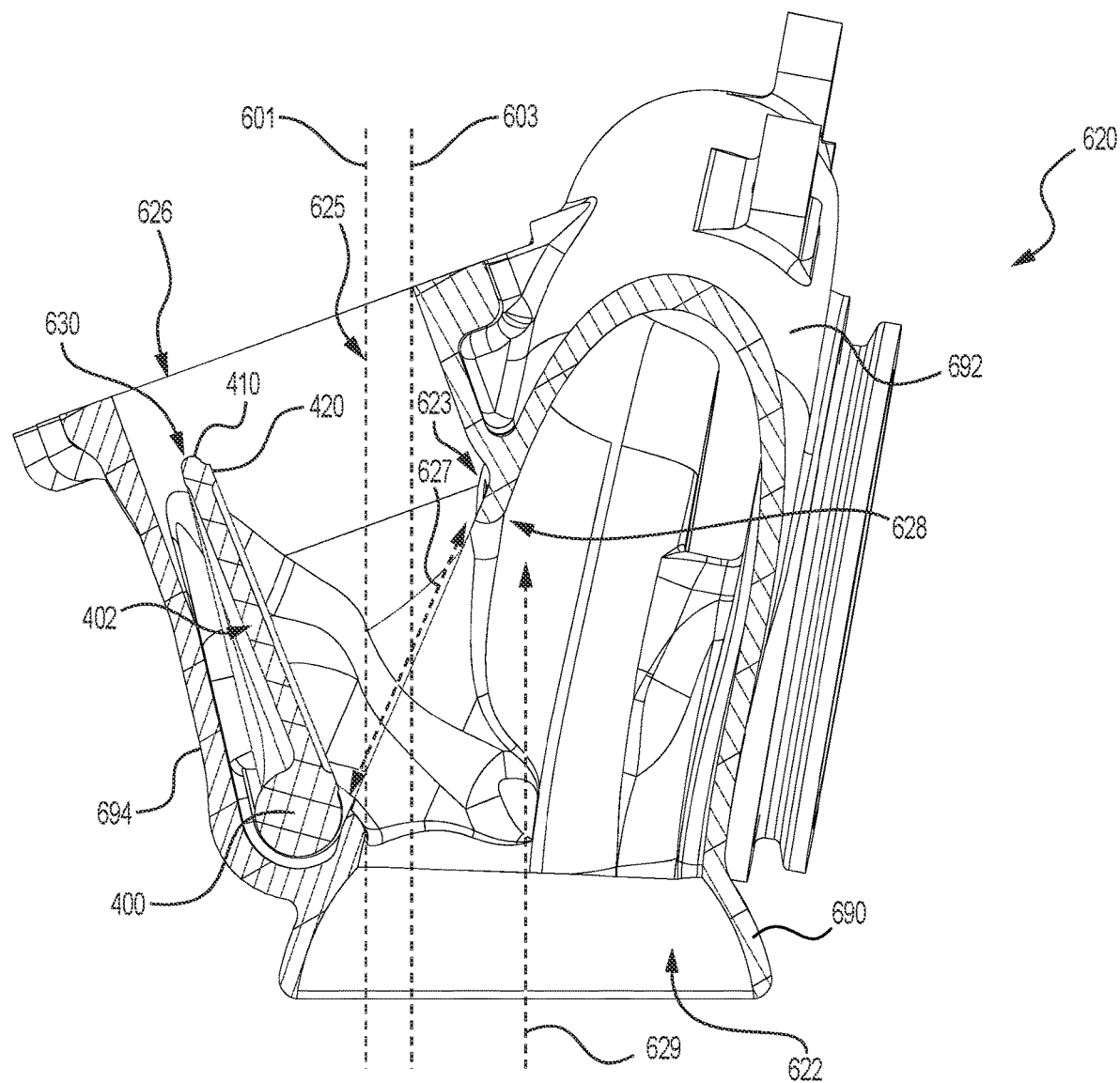
FIG. 15 is the cross-sectional view of FIG. 14, with the valve in an open position.

The valve 630 is controlled to regulate the flow of exhaust gas through the turbocharger 300 by selectively blocking or opening a valve opening 627 (FIG. 15) defined by the valve seat 623 of the passage 625. The valve opening 627 defined by the valve seat 623 is thus shaped such that it corresponds to the shape of a body portion 402 of the valve 630 (i.e., generally elongated and having a rounded tip). The valve 630 is pivotably mounted at the valve seat 623 via its base portion 400 and is selectively movable between: an open position in which exhaust gas flow through the valve opening 627 (and thus the passage 625) is substantially unimpeded by the valve 630; a closed position in which the valve 630 fully closes the valve opening 627 such that exhaust gas flow through the valve opening 627 is cut-off by the valve 630; and any number of intermediate positions between the open and closed positions. In this implementation, as shown in FIG. 15, in its open position, the valve 630 is at approximately 45° (measured from the valve seat 623—i.e., 0° corresponding to the closed position of the valve 630). Moreover, in the open position, the valve 630 contacts a wall of the bypass conduit 620 on a side opposite the flow divider 628, but this may not be the case in all implementations.

Figure 16:
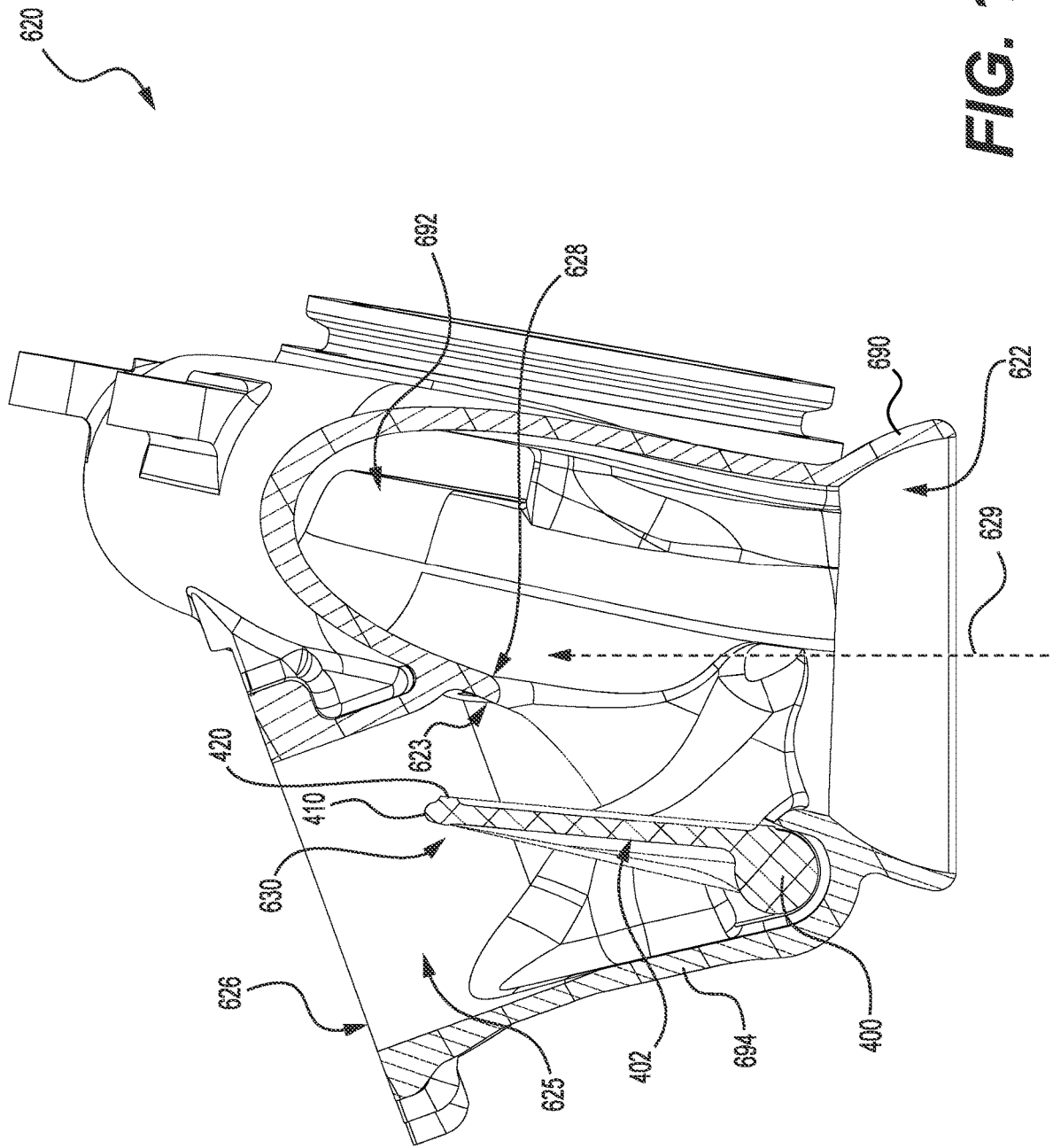
FIG. 16 is the cross-sectional view of FIG. 14, with the valve in an intermediate position.
Figure 17:
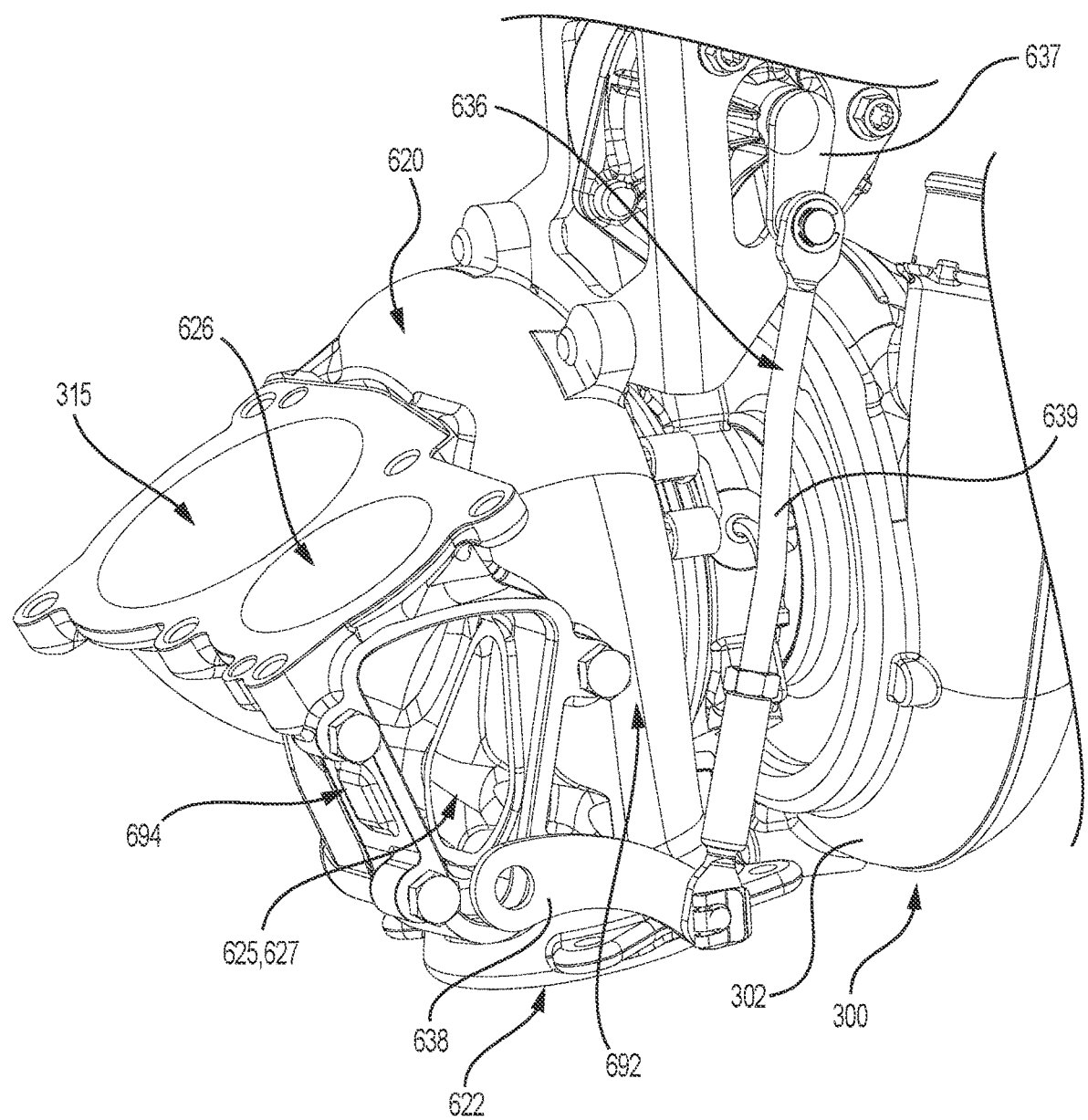
FIG. 17 is a perspective view of portions of the turbocharger and the bypass conduit of FIG. 12, with a portion of the top of the bypass conduit and the valve having been removed.
Figure 18:
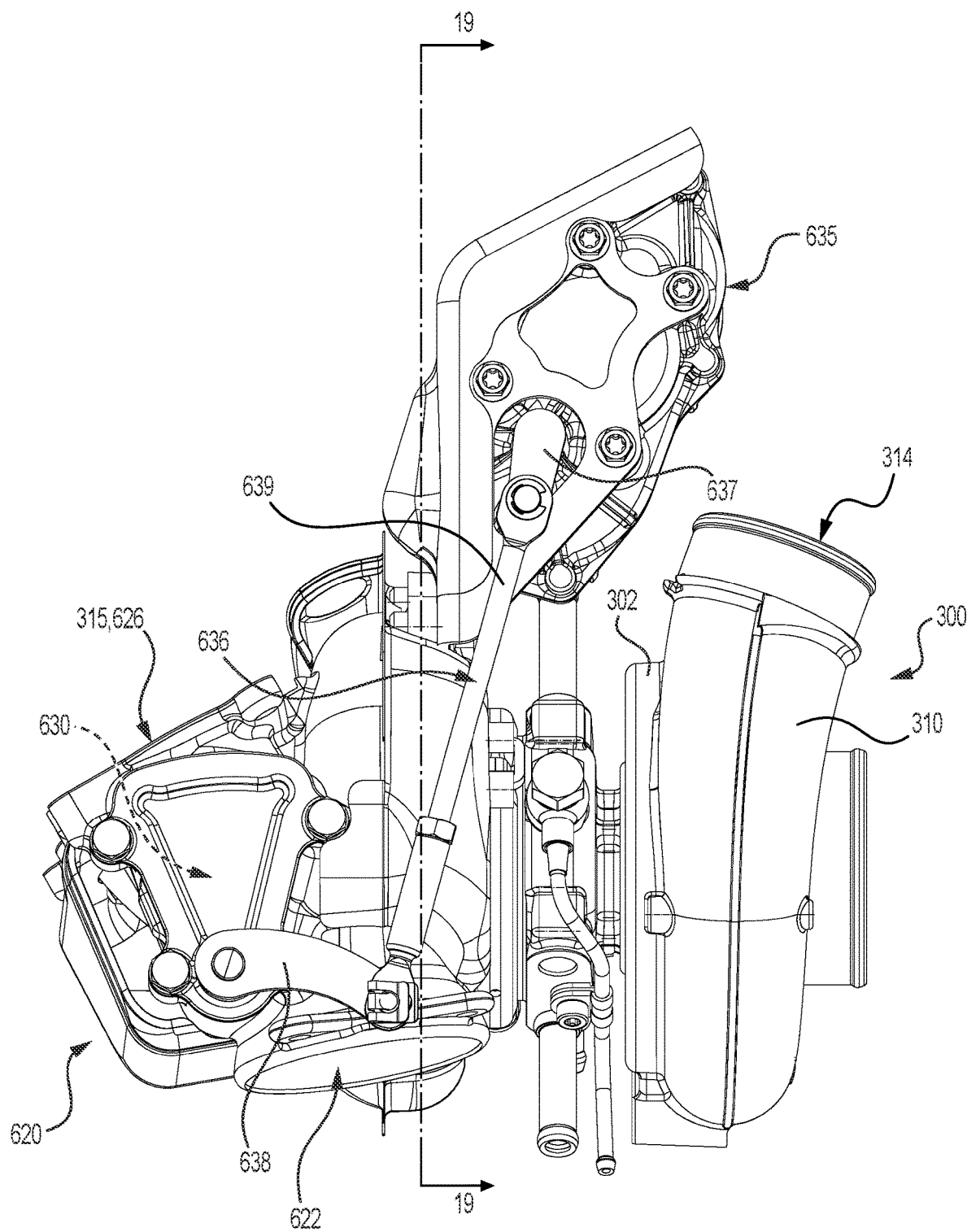
FIG. 18 is a top plan view of the turbocharger and bypass conduit of FIG. 12.

A cross-section of the bypass conduit 620 is illustrated in FIGS. 14 to 16 to show the different positions of the valve 630. FIG. 14 illustrates the closed position; FIG. 15 illustrates the open position; and FIG. 16 illustrates one of the many possible intermediate positions of the valve 630. As can be seen, the valve 630 is oriented in the bypass conduit 620 such that its rounded tip 410 is downstream of the base portion 400. That is, in the open, closed and intermediate positions, the rounded tip 410 of the valve 630 is downstream of the base portion 400. The exhaust gas flow through the bypass conduit 620 for each of the relative positions of the valve 630 will be described in more detail below. As can be seen in FIG. 14, in its closed position, the valve 630 contacts the valve seat 623. More specifically, in the closed position, a ridge 420 of the body portion 402 of the valve 630 sits against the valve seat 423.

The exhaust system 600 further includes the system controller 500, which is operatively connected to an engine control unit (or ECU) and/or the electrical system (not shown) of the snowmobile 10. The engine control unit is in turn operatively connected to the engine 26. As will be described in more detail below, the system controller 500 is also operatively and communicatively connected to an atmospheric pressure sensor 504, also referred to as an air intake sensor 504, for sensing the atmospheric or ambient air pressure of the intake air coming into the air intake system 100. It should be noted that the atmospheric pressure sensor 504, also referred to herein as an intake pressures sensor 504, senses the air pressure in the primary airbox 120, and as such measures the air intake pressure from air entering either from the ambient air around the snowmobile 10 and/or the air entering the primary airbox 120 from the turbocharger 300.

The actuator 635 for selectively moving the valve 630 is communicatively connected to the system controller 500 such that the position of the valve 630 is controllable thereby. It is contemplated that the valve 630 could be differently controlled or moved, depending on the implementation.

As is illustrated in the schematic diagram of FIG. 8 and as will be described in more detail below, the system controller 500 is also operatively connected to the throttle valve position sensor 588 for determining the position of the throttle valve 39, a rate of opening of the throttle valve 39, or both. In some modes of operation of the exhaust system 600, the valve 630 is selectively moved based on the throttle valve position determined by the throttle valve position sensor 588. In some modes of operation of the exhaust system 600, the valve 630 is selectively moved based on the rate of change of the throttle valve position or the rate of opening of the throttle valve 39, as determined by the throttle valve position sensor 588.

Figure 8:
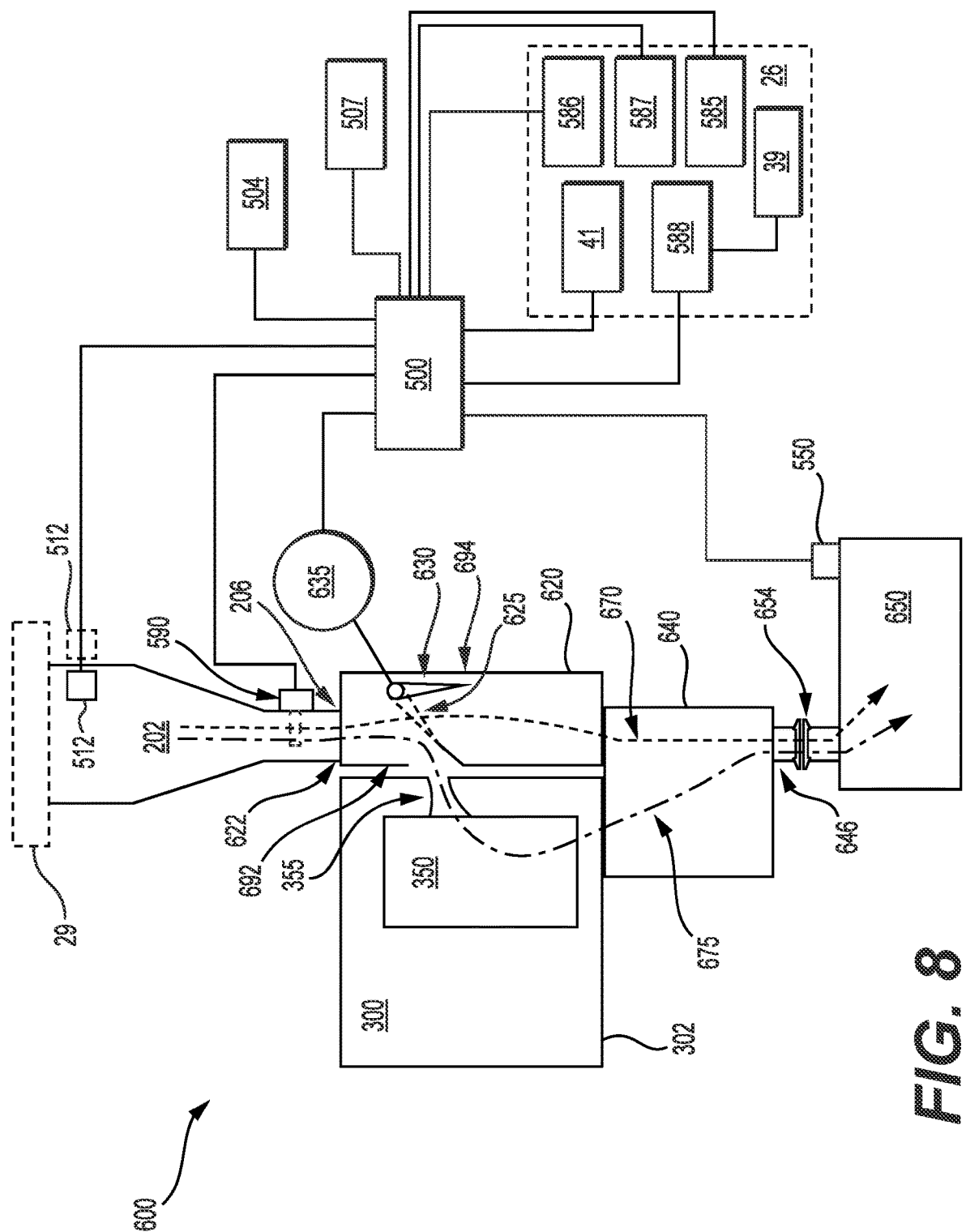
FIG. 8 is a schematic representation of the exhaust system of FIG. 2.
Figure 9:
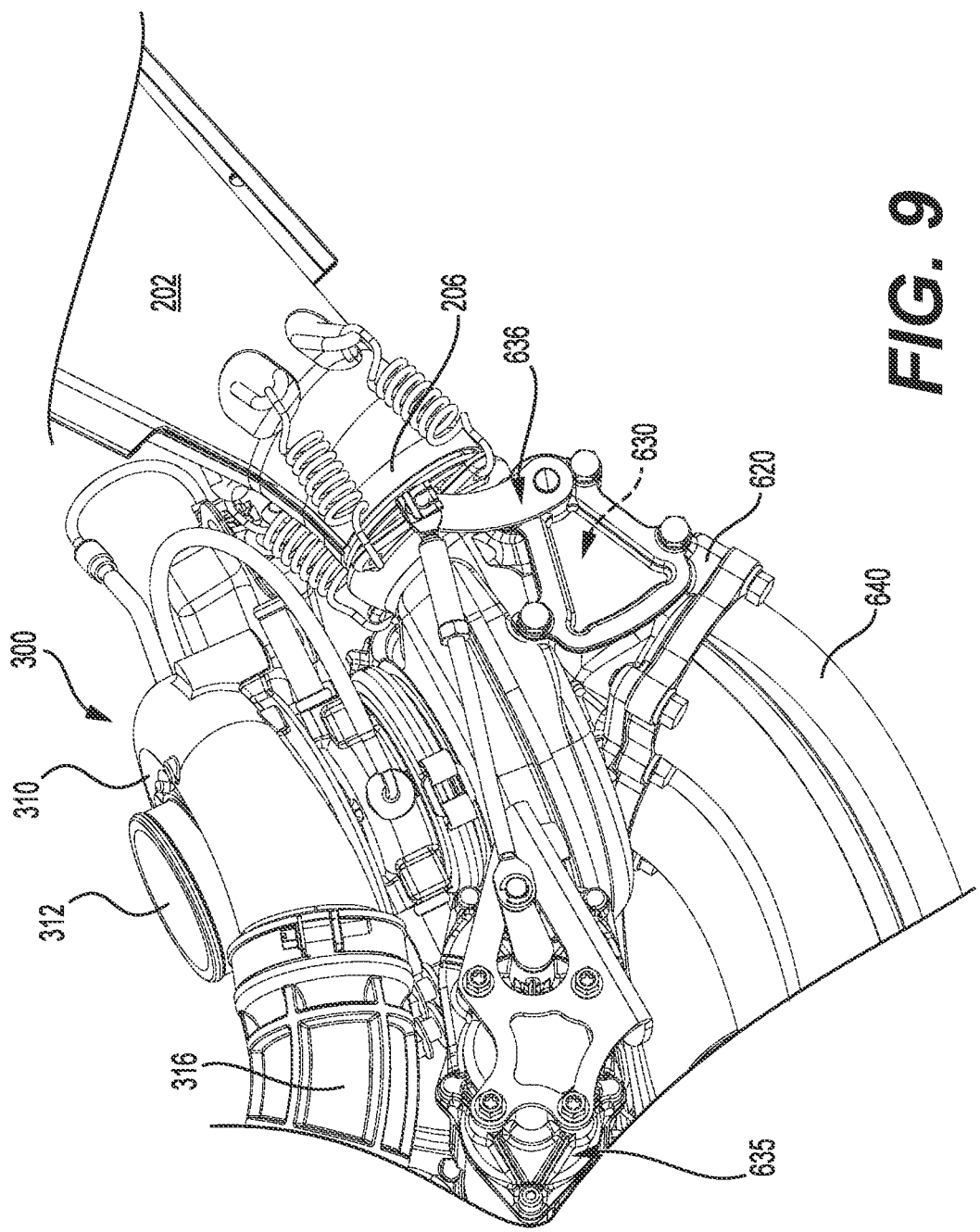
FIG. 9 is a close-up view of the portions of the air intake system and exhaust system of FIG. 5.

As is illustrated schematically in FIG. 8, the system controller 500 is further connected to an exhaust pressure sensor 590 for sensing the pressure at a point along an exhaust path of the engine 26, near the exhaust outlets 29. The pressure sensed by the exhaust pressure sensor 590 is used to determine the back pressure of the engine 26. Back pressure, also known as the exhaust gas pressure, is understood to be the resistance to the flow of the exhaust gas between the engine 26 and an outlet of the muffler 650 due, at least in part, to twists, bends, obstacles, turns and sharp edges present in the various components of the exhaust system 600. Reducing back pressure can assist in optimizing performance of the engine 26, as high back pressure can negatively impact the efficiency of the engine performance. Reducing the amount of back pressure in the exhaust system 600 may also have the effect of reducing what is known as "turbo lag", which is a delay in the response of a turbocharged engine after the throttle lever 86 has been moved for operating the throttle system.

Furthermore, in order to ensure good scavenging within the cylinders of the engine 26, in this embodiment, a ratio of the exhaust pressure over the intake pressure (as measured by the sensors 590, 504 respectively) is kept relatively constant. Notably, in this embodiment, the ratio of the exhaust pressure over the intake pressure is maintained between 1.1 and 1.25.

With reference to FIG. 5, in the present implementation, the exhaust pressure sensor 590 is configured to sense the pressure along the exhaust path of the engine 26. In particular, the exhaust pressure sensor 590 has a sensing port (not shown) which is fluidly connected to the exhaust pipe 202. In the present implementation, the exhaust pressure sensor 590 senses a pressure within the diverging portion 605 of the exhaust pipe 202 but it is contemplated that the exhaust pressure sensor 590 could be configured so as to sense a pressure along other areas of the exhaust pipe 202. The sensing port of the exhaust pressure sensor 590 is connected via intermediate tube members to the exhaust pipe 202 since the exhaust pressure sensor 590 is not designed to withstand the elevated temperatures within the exhaust pipe 202. Notably, a metallic tube 593 is fluidly connected to the exhaust pipe 202, and a rubber tube 591 is in turn fluidly connected between the metallic tube 593 and the sensing port of the exhaust pressure sensor 590. It is contemplated that, in other embodiments, a single tube of a material that can resist the temperatures of the exhaust pipe 202 (e.g., a metallic material) may fluidly connect the sensing port of the exhaust pressure sensor 590 to the exhaust pipe 202. The lengths and diameters of the tubes 591, 593 are chosen so that pressure waves travelling through the exhaust pipe 202 are not significantly distorted when they arrive at the sensing port of the exhaust pressure sensor 590, thus ensuring greater accuracy of the pressure sensed by the exhaust pressure sensor 590. It is contemplated that the exhaust pressure sensor 590 could be differently arranged, depending on details of a particular implementation. In some implementations, the system 600 could further include a differential sensor for determining a pressure differential between the air intake pressure entering the engine 26 and the exhaust pressure of exhaust gas exiting the engine 26. It is also contemplated that the differential sensor could replace one or both of the intake pressure sensor 504 and the exhaust pressure sensor 590 in some implementations.

As is also illustrated in FIG. 8, the system controller 500 is further connected to several sensors for monitoring various exhaust system components. The system controller 500 is communicatively connected to an exhaust pipe temperature sensor 512 configured to generate a signal representative of a temperature of exhaust gas flowing within the exhaust pipe 202. More specifically, as shown in FIG. 8, in this embodiment, the temperature sensor 512 includes a temperature probe that extends within the exhaust pipe 202 and thus measures the temperature of exhaust gas flowing within the exhaust pipe 202. As shown in FIG. 5, the temperature probe of the temperature sensor 512 is connected to the outer surface of the exhaust pipe 202 within the converging section 607, but other positions along the exhaust pipe 202 are contemplated. Alternatively, as shown schematically in FIG. 8, in some embodiments, the temperature probe of the exhaust pipe temperature sensor 512 may not extend within the exhaust pipe 202 and could instead be positioned on the outer surface of the exhaust pipe 202. As such, the temperature measured by the temperature sensor 512 could be the temperature of the outer surface of the exhaust pipe 202. Alternatively, any other parameter that can be used to determine or infer a temperature associated with the temperature of the exhaust gas flowing within the exhaust pipe 202 could be used in other embodiments. Similarly, the system controller 500 is communicatively connected to a muffler temperature sensor 550 to detect the temperature of the muffler 650. These sensors 512, 550 could be used to monitor possible overheating or temperature imbalances, as well as to provide information to the system controller 500 to use in control methods such as those described herein. In order to determine an engine speed of the engine 26, the system controller 500 is further communicatively connected to an engine sensor 586 disposed in communication with the engine 26.

Figure 20C:
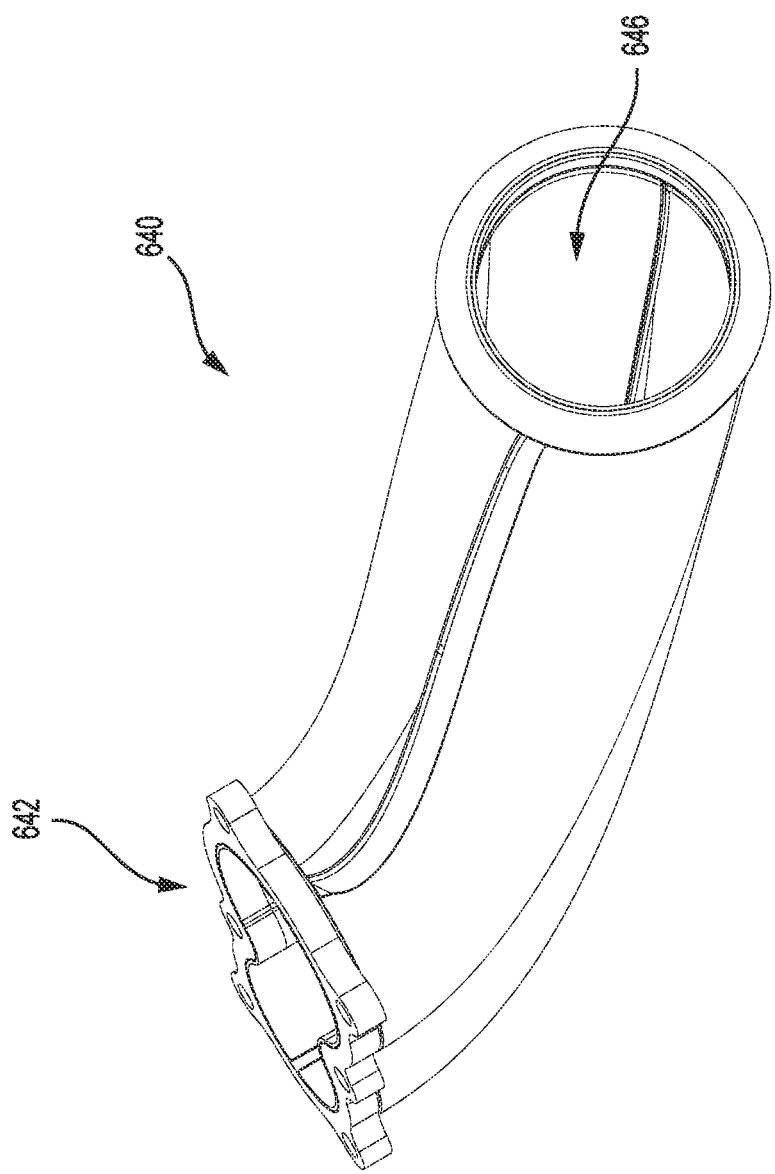
FIG. 20C is a bottom plan view of the exhaust collector of FIG. 20A.

The exhaust system 600 further includes an exhaust collector 640 fluidly connected to the bypass conduit 620 and the turbocharger 300. The exhaust collector 640, shown in isolation in FIGS. 20A to 20C, includes an inlet 642 through which the exhaust collector 640 receives exhaust gas from both the bypass conduit 620 and the exhaust turbine 350.

More specifically, the inlet 642 receives exhaust gas that bypasses the exhaust turbine 350 and exits through the outlet 626 of the bypass conduit 620. The inlet 642 also receives exhaust gas that has passed through the exhaust turbine 350 from an outlet 315 of the turbocharger housing 302. The inlet 642 includes two portions: a lower portion 643 and an upper portion 645. The lower and upper portions 643, 645 are integrally connected to define a peanut-shaped opening in the inlet 642. It is contemplated that the inlet 642 could be differently shaped depending on the implementation.

The lower portion 643 is fluidly connected to the housing 302 to receive exhaust gas therethrough from the exhaust turbine 350 through the outlet 315. The upper portion 645 is fluidly connected to the bypass conduit outlet 626 to receive therethrough the exhaust gas that has bypassed the exhaust turbine 350. The exhaust collector 640 also includes an outlet 646, through which exhaust gas passing into the exhaust collector 640 exits. It is contemplated that the two inlet portions 643, 645 could be separated in some implementations, such that the exhaust collector 640 could be generally Y-shaped for example.

The exhaust collector 640 is bolted to the housing 302 and the bypass conduit 620 using through-holes 641 defined in a periphery of the inlet 642. It is contemplated that the exhaust collector 640 could be differently connected to the turbocharger housing 302 and the bypass conduit 640 in different implementations. It is also contemplated that the exhaust collector 640 could be integrally formed with the bypass conduit 620 and/or the turbocharger housing 302.

Figure 10:
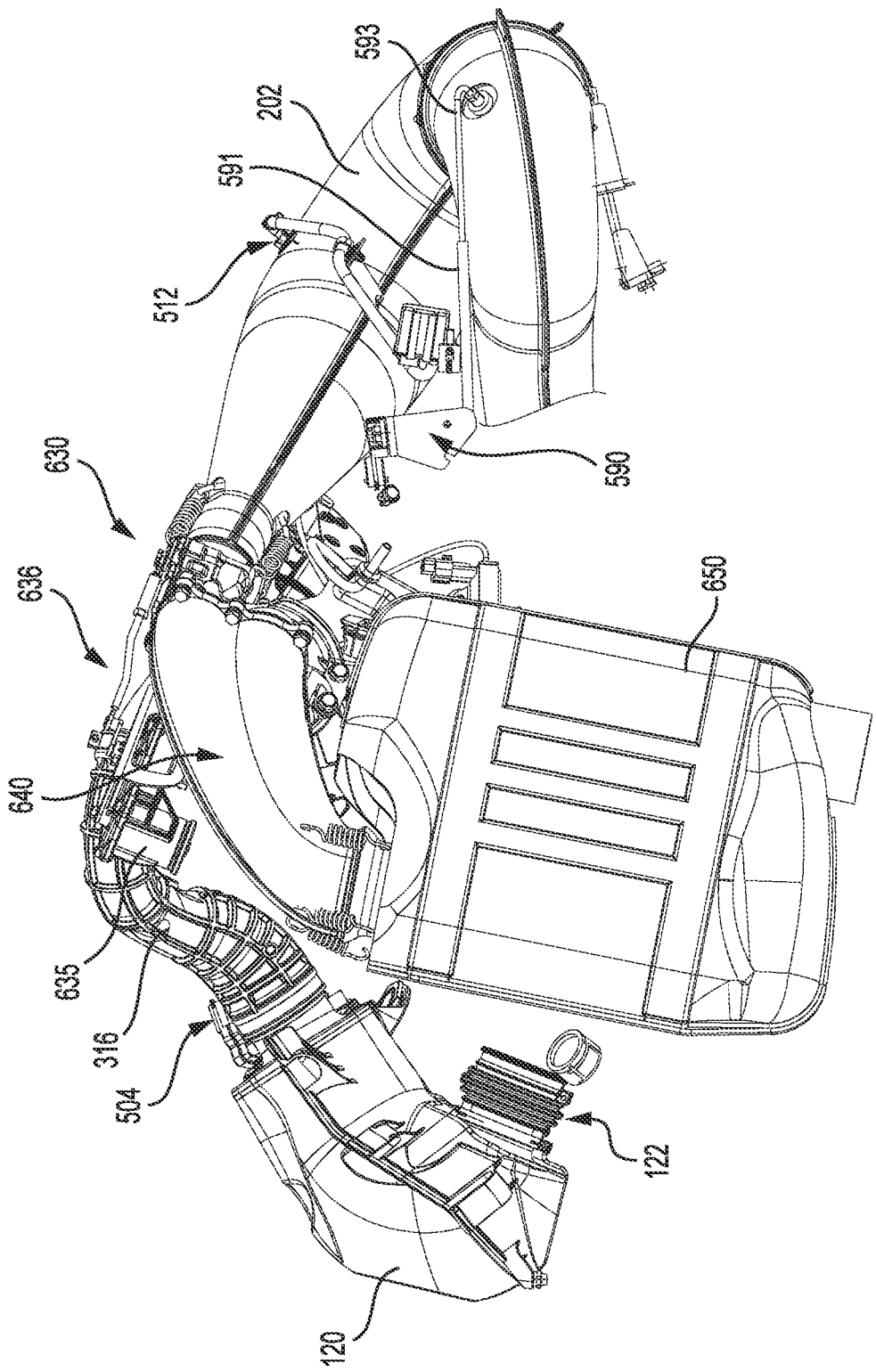
FIG. 10 is a right side elevation view of portions of the air intake system and the exhaust system of FIG. 2.
Figure 11:
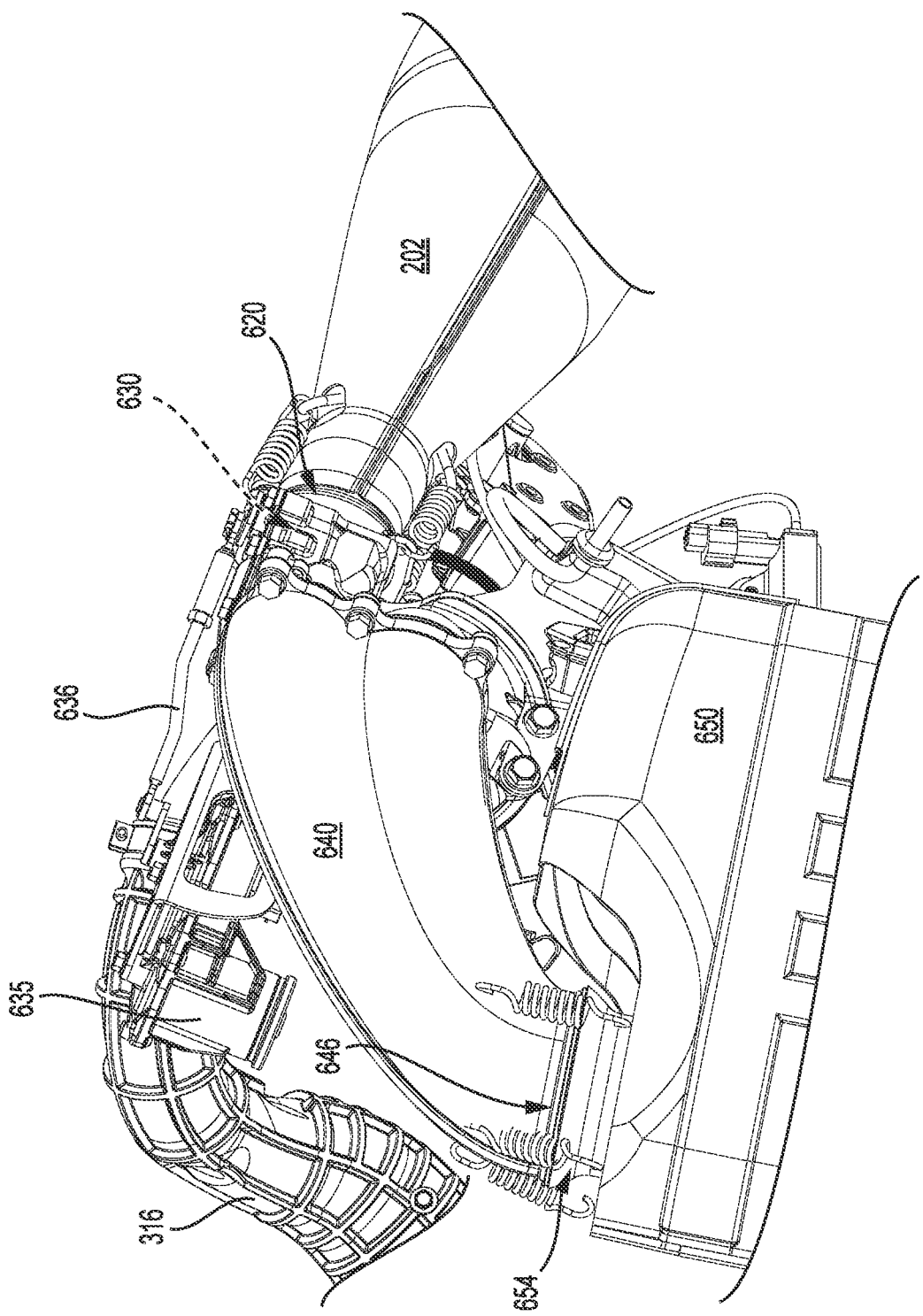
FIG. 11 is a close-up view of the portions of the air intake system and exhaust system of FIG. 10.

With reference to FIG. 10, the exhaust system 600 includes a muffler 650. The muffler 650 includes one muffler inlet 654 through which to receive exhaust gas from the exhaust system 600. The muffler 650 is fluidly connected to the collector outlet 646 of the exhaust collector 640. The muffler inlet 654 and the collector outlet 646 are held in place by springs as can be seen in the Figures. It is contemplated that different methods could be employed to connect the muffler 650 to the exhaust collector 640. As can be seen in the Figures, the muffler 650 includes only the single inlet 654 for receiving exhaust gas both bypassing and passing through the exhaust turbine 350.

Flow of the exhaust gas through the exhaust system 600, specifically between the exhaust pipe 202 and the muffler 650, will now be described in more detail. As is described briefly above, the valve 630 in the bypass conduit 620 selectively controls the flow of exhaust gas either into the exhaust turbine 350 or bypassing the exhaust turbine 350 by sending the exhaust gas out through the conduit outlet portions 692, 694.

The bypass conduit 620 is designed and arranged to balance two competing interests: the first being to allow for efficient exhaust gas flow when bypassing the turbocharger 300 in order to operate the engine 26 as a naturally aspirated engine 26, and the second being not impeding efficient operation of the turbocharger 300 when desired. In traditional turbo-charged engines, all exhaust gas would be directed to the turbocharger 300, with an associated bypass only being used in the case of too much exhaust gas flow into the turbocharger. In the present technology, exhaust gas can be directed either to bypass the turbocharger 300 for naturally aspirated operation or into the turbocharger 300 for turbo-charged operation. The inclusion of the intake bypass valve 123 further aids in allowing for naturally aspirated operation or turbo-charged operation of the engine 26. As is described above, the intake bypass valve 123 allows for atmospheric or ambient airflow into the primary airbox 120 when the pressure in the primary airbox 120 falls below a threshold, due the turbocharger 300 not operating or spooling up and thus not providing sufficient compressed air to the primary airbox 120. By including both the valve 630 and the bypass valve 123, each of which are independently operated, both air intake and exhaust gas are managed to allow for naturally aspirated or turbo-charged operation of the engine 26.

As is mentioned above, exhaust gas entering the bypass conduit 620 flows generally parallel to the central axis 629 of the inlet 622. As can be seen in FIGS. 13 to 16, the central axis 629, and thus the center of the flow of exhaust gas, is directed to the turbine outlet portion 692 side of the flow divider 628. As the flow divider 628 is situated toward the bypass side with respect to the central axis 629, it should be understood that more than half of the exhaust gas flow is therefore initially directed toward the turbine outlet portion 692.

On the bypass outlet portion 694 side of the central axis 629 (to the left of the axis 629 in the Figures), it can also be seen that some of the exhaust gas flow, parallel to the central axis 629, is directed toward the opening 627. As the conduit inlet 622 and opening 627 of the passage 625 are at least partially aligned along the direction of the central axis 629, at least a portion of the exhaust gas entering the conduit inlet 622 parallel to the flow axis flows unobstructed into the bypass passage 625 when the valve 630 is in the open position. As the engine 26 is intended to be naturally aspirated in standard operation, at least a portion of exhaust gas flowing generally directly through the bypass conduit 620 and into the exhaust collector 640, with a minimum of turns, bends, etc. further assists in decreasing back pressure, again in the aims of optimizing engine performance.

It should be noted that, as will be described further below, the percentage of exhaust gas flow directed toward each of the output conduits 692, 694 does not necessarily correspond to the percentage of exhaust gas that flows therethrough.

The two different flow patterns of exhaust gas entering the bypass conduit 620 will now be described in reference to flow paths 670, 675 schematically illustrated in FIG. 8. Depending on the position of the valve 630, the exhaust gas can flow along a bypass exhaust flow path 670, a turbine exhaust flow path 675, or a combination of the two paths 670, 675.

Exhaust gas flowing along the bypass exhaust flow path 670 passes through the passage 625, which is not blocked by the valve 630 when the valve 630 is in the open position. The bypass exhaust flow path 670 is defined from the exhaust inlet 622 of the bypass conduit 620 to the exhaust collector 640. Exhaust gas flowing along the bypass exhaust flow path 670 passes through the exhaust inlet 622, then through the bypass conduit 620, and then into the exhaust collector 640. Specifically, exhaust gas flowing along the bypass exhaust flow path 670 is received in the upper portion 645 of the inlet 642.

The turbine exhaust flow path 675 is similarly defined from the exhaust inlet 622 of the bypass conduit 620 to the exhaust collector 640. Exhaust gas flowing along the second exhaust flow path passes through the exhaust inlet 622, then through the turbine outlet portion 692 of the bypass conduit 620, then through the exhaust turbine 350, and then into the exhaust collector 640. Specifically, exhaust gas flowing along the turbine exhaust flow path 675 is received in the lower portion 643 of the inlet 642.

For each flow path 670, 675, exhaust gas passes out of the collector outlet 646 and into the muffler inlet 654. The single muffler inlet 654 of the muffler 650 receives the exhaust gas from both the bypass exhaust flow path 670 and turbine exhaust flow path 675.

Even though the majority of exhaust gas flow is oriented toward the turbine outlet portion 692, a majority of the exhaust gas entering the exhaust inlet 622 flows along the bypass exhaust flow path 670, through the bypass outlet portion 694, when the valve 630 is in the open position. The flow path 675 through the exhaust turbine 350, designed to turn under pressure from exhaust gas flowing therethrough, is more restrictive and causes more back pressure than the flow path 670 through the bypass passage 625. More of the exhaust gas is therefore directed through the passage 625, even if the initial flow direction is toward the turbine outlet portion 692. It should be noted that a portion of the exhaust gas entering the bypass conduit 620 will still flow through the exhaust turbine 350 even when the valve 630 is fully open.

When the valve 630 is in the closed position, a majority (generally all) of the exhaust gas entering the exhaust inlet 622 flows along the turbine exhaust flow path 675. As is illustrated schematically, exhaust gas flowing along the turbine exhaust flow path 675 is deflected by the valve 630, as the valve 630 blocks the passage 625 in the closed position. As some of the exhaust gas entering through the conduit inlet 622 flows in parallel to the central axis 629, at least a portion of the valve 630 is contacted by, and diverts, exhaust gas entering the inlet 622.

As is mentioned above, the valve 630 can also be arranged in an intermediate position, such as that illustrated in FIG. 16 (just as one non-limiting example). With the valve 630 in the intermediate position, a portion of the exhaust gas is allowed through the passage 625 to bypass the exhaust turbine 350 and a portion of the exhaust gas is deflected through the turbine outlet portion 692 toward the exhaust turbine 350. In the intermediate position, at least a portion of the valve 630 is contacted by the exhaust gas entering through the conduit inlet 622 and flowing parallel to the axis 629.

The exhaust gas thus flows along both of the bypass exhaust flow path 670 and the turbine exhaust flow path 675 when the valve 630 is in one of the intermediate positions. The ratio of the portion of exhaust gas flowing along the bypass exhaust flow path 670 to the portion of exhaust gas flowing along the turbine exhaust flow path 675 depends on various factors, including at least the angle at which the valve 630 is arranged. Generally, the closer the valve 630 is to the open position, the more exhaust gas will flow along the bypass exhaust flow path 670 and vice versa.

As will be described in more detail below, the valve 630 is used to manage exhaust gas flow through the flow paths 670, 675. For example, in some scenarios, the valve 630 is selectively moved to the closed position (or toward the closed position) when the engine 26 is operated below a threshold atmospheric pressure. In such a scenario, the turbocharger 300 could be used to help boost engine performance when the snowmobile 10 climbs in altitude, where the air is thinner and as such less oxygen will enter the engine 26 (having a detrimental effect on performance).

Regardless of the position of the valve 630, in this implementation, there is no physical barrier blocking air flow between the exhaust inlet 622 and the turbine inlet 355. As is mentioned above, a portion of the exhaust gas entering through the bypass inlet 622 passes through the turbine outlet portion 692 and enters the exhaust turbine 350 through the turbine inlet 355, even when the valve 630 is in the open position. The relatively small portion of exhaust gas entering the exhaust turbine 350 aids in creating a pressure difference between positions upstream from the exhaust turbine 350 and downstream therefrom. This pressure difference generally improves the responsiveness of the turbocharger 300, generally making the exhaust turbine 350 spool up more rapidly and assisting in decreasing the turbo lag.

Similarly, there is no physical barrier closing the turbine outlet 315 when the exhaust gas flows along the bypass exhaust flow path 670. As such, flow of exhaust gas out of the bypass outlet 626 causes an air pressure reduction in the turbine outlet 315. This low pressure zone also assists in decreasing the turbo lag and in increasing the spool up speed. It is also noted that there is also no barrier closing the bypass outlet 626 when the exhaust gas is directed to the turbine exhaust flow path 675 and flowing out of the turbine outlet 315.

The exhaust system 600, according to the present technology and as described above, is generally intended to be operated as a naturally aspirated engine system, with the exhaust gas generally bypassing the exhaust turbine 350, other than in specific scenarios where additional boost from the turbocharger 300 is necessitated. This is in contrast to some standard turbo-charged engine arrangements, where a turbocharger is used in standard operation and a turbocharger bypass is used to prevent overload of the compressor.

In the arrangement and alignment of the exhaust system 600 of the present technology, in contrast to conventional turbocharger arrangements, a majority of the exhaust gas flows through the passage 625 when the valve 630 is in the open position (described above). Exhaust gas flow, especially to allow the gas to bypass the turbocharger 300 without creating excessive back pressure, is further managed by the comparative cross-sections of the two flow paths 670, 675. Specifically, the area of the opening 627 of the passage 625 (for the bypassing flow path 670) and the intake area 354 of the exhaust turbine 350 (in the turbine flow path 675) are of similar dimensions.

The arrangement of the relative areas of the openings 627, 355 in the two flow paths 670, 675 allows exhaust gas to both bypass the exhaust turbine 350 without creating excessive back pressure (which can be detrimental to operation of the engine 26) while still allowing good exhaust gas flow through the turbine inlet 355 when the turbine 300 is solicited. In this embodiment, the area of the opening 627 is generally between 0.75 and 1.25 times the area 354 of the turbocharger inlet 355. In the present implementation, the area 354 of the turbocharger inlet 355 is slightly greater than the area of the opening 627. It is contemplated, however, that the area of the opening 627 could be greater than the area 354 of the turbocharger inlet 355 in some implementations.

In further contrast to conventional turbocharger arrangements, the bypass outlet 626 has been specifically arranged such that there is not an excessive amount of deviation of the exhaust flow necessary for the flow to travel from the bypass conduit inlet 622 to the bypass outlet 626. A normal of the bypass outlet 626 is at an angle of about 20 degrees to the central axis 629 in the present implementation (although the exact angle could vary). With this arrangement, a portion of the exhaust gas entering the inlet 622, illustrated between lines 601 and 603 in FIG. 15, both parallel to the central axis 620, will pass directly through the bypass conduit 620, meaning through the passage 625 and the opening 627, and out of the bypass outlet 626 without deviating. This is true even for a plurality of positions of the valve 630 between the fully open and fully closed positions.

When the snowmobile 10 is not being operated below a threshold atmospheric pressure, the exhaust system 600 will tend to send exhaust gas along the bypass exhaust flow path 670 bypassing the exhaust turbine 350 and the engine 26 will operate as a naturally aspirated engine 26. When the snowmobile 10 is operated below such a threshold air intake pressure, for example at high altitudes/low atmospheric pressure, the valve 630 will move toward the closed position (either partially or completely) to send some or all of the exhaust gas to the exhaust turbine 350 to provide boost to the engine 26. More details pertaining to operation of the valve 630 with respect to operating conditions will be provided below.

Example Operation of the Exhaust System

Figure 21:
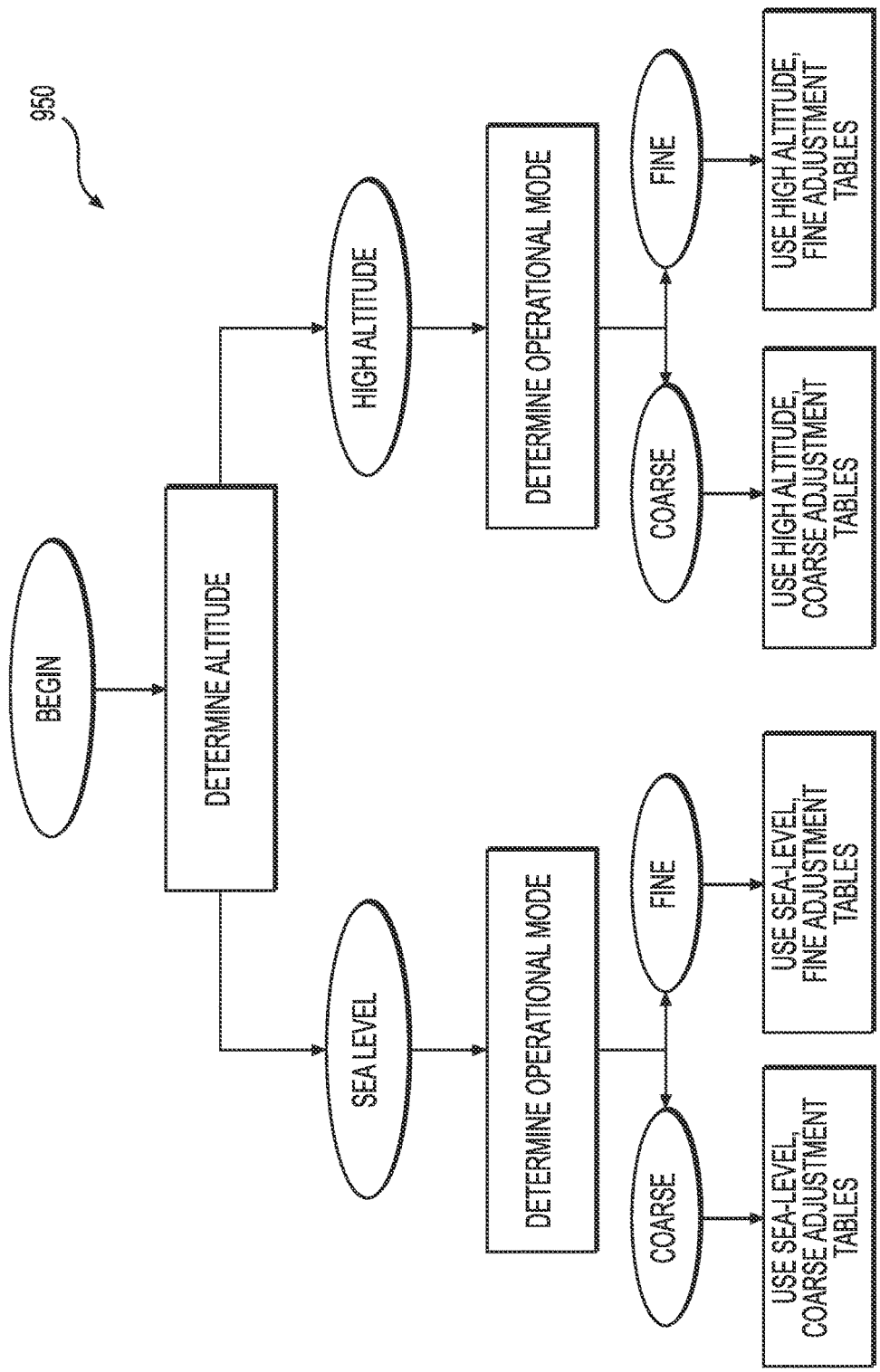
FIG. 21 is a flowchart representing an illustrative scenario of controlling exhaust gas flow through the exhaust system of FIG. 2.
Figure 22:
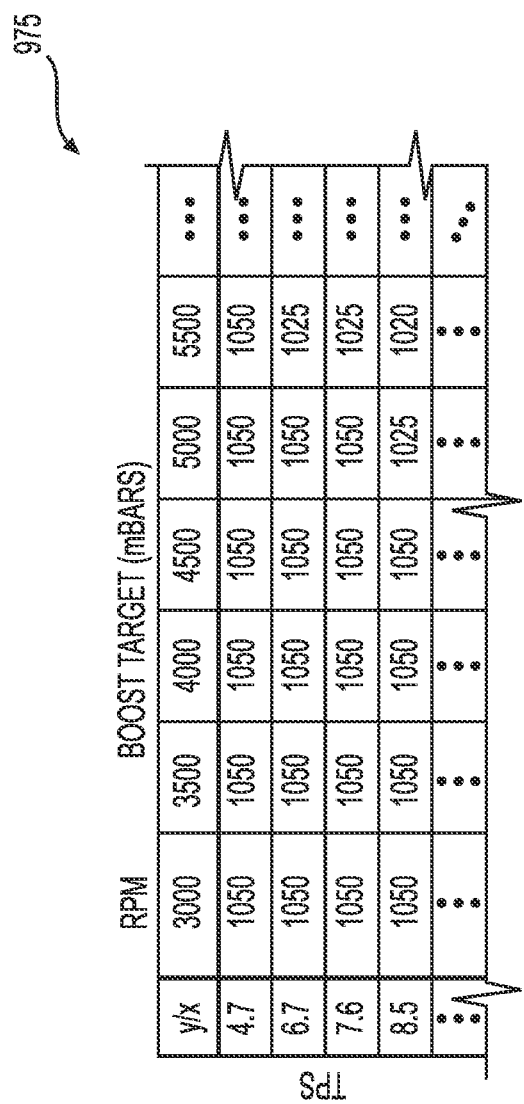
FIG. 22 illustrates an example dataset for use in the illustrative scenario of FIG. 21.
Figure 23:
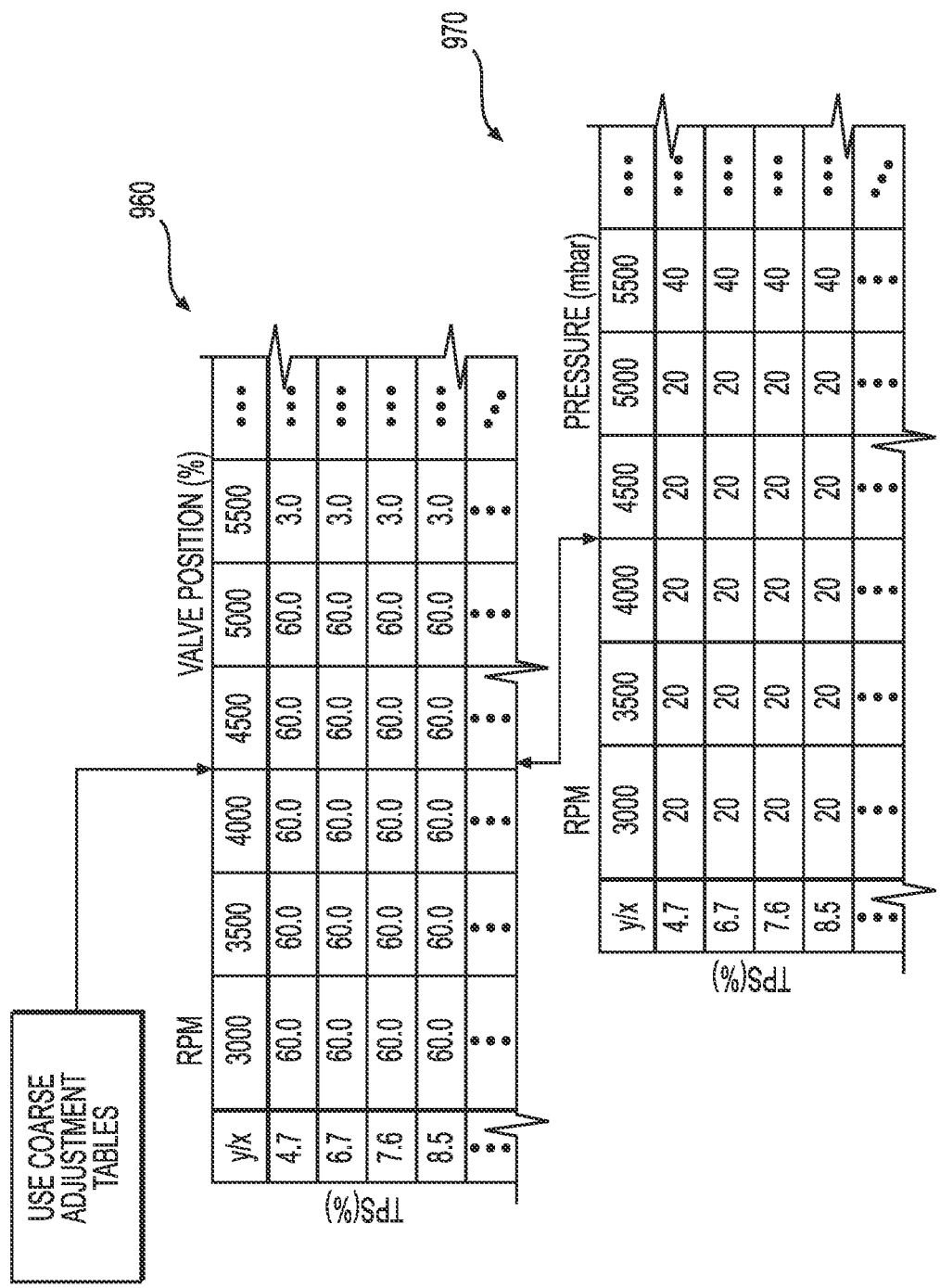
FIG. 23 illustrates additional example datasets for use in the illustrative scenario of FIG. 21.
Figure 24:
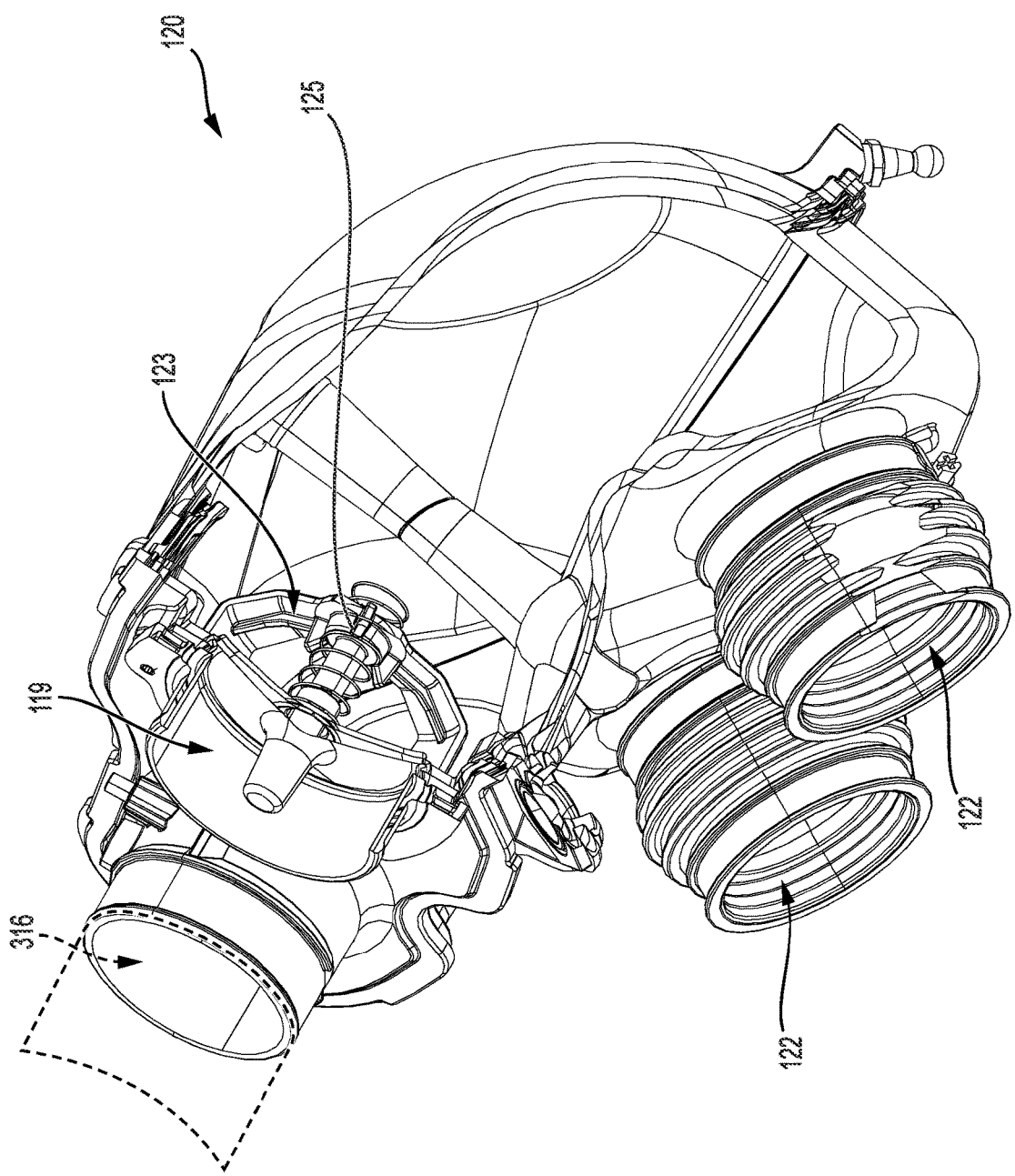
FIG. 24 is a partial cut-away view of an airbox of the air intake system of FIG. 2, with a portion of a left side of the airbox having been removed.
Figure 25:
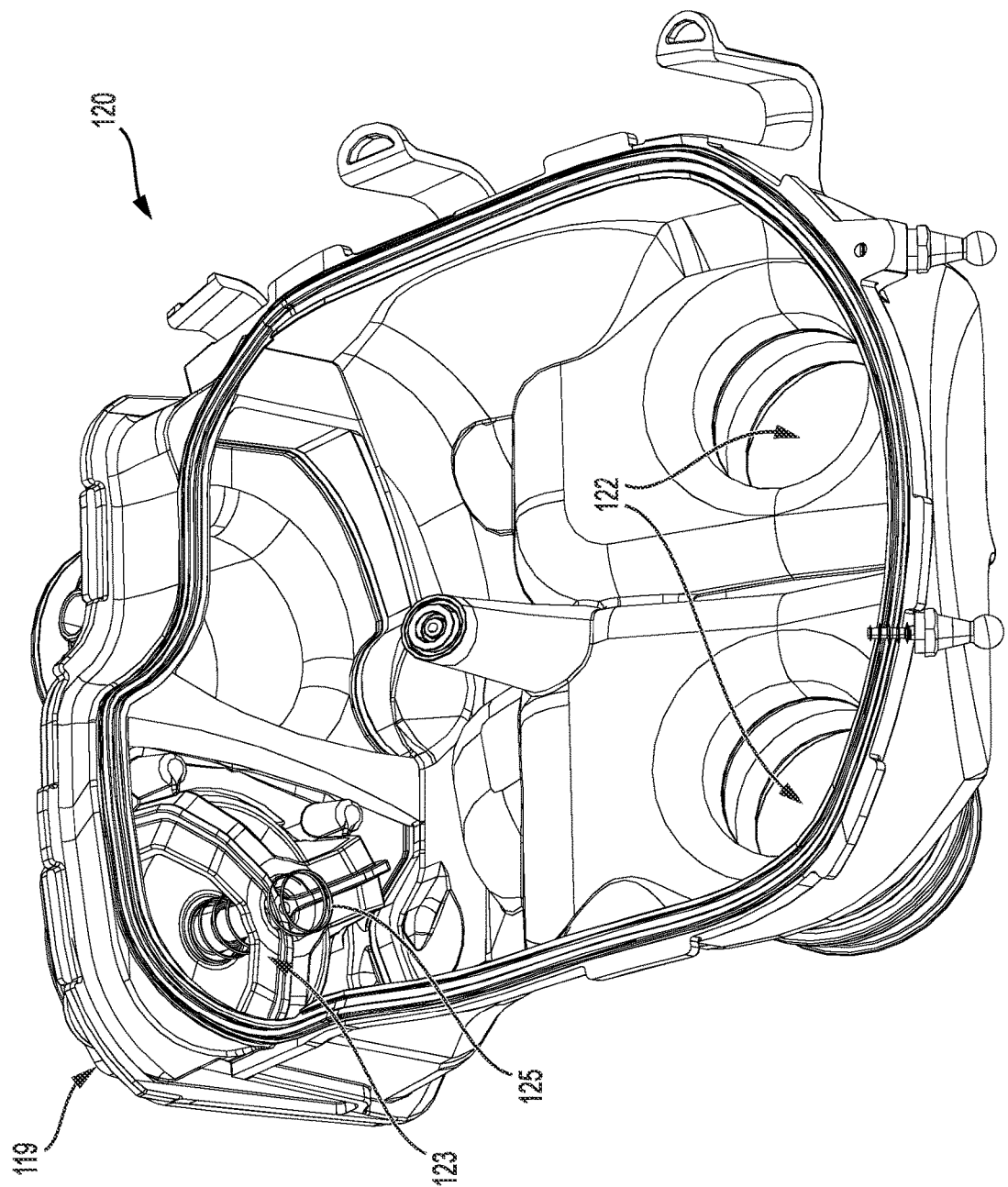
FIG. 25 is a partial cut-away view of the airbox of FIG. 24, with a portion of a rear side of the airbox having been removed.

With reference to FIGS. 21 and 22, one non-limiting illustrative scenario of operation of the exhaust system 600 will now be described. It should be noted that this is simply one non-limiting example to provide a high-level understanding of the general operation of the exhaust system 600, and different implementations and details will be set out below.

Broadly stated, the system controller 500 retrieves predetermined positions of the valve 630 from data tables (datasets) based on throttle position (TPS) and engine speed (RPM). Depending on the particular mode of operation (described further below), the exhaust pressure, input pressure, or a difference between the two are simultaneously monitored by comparing their values to similar predetermined pressure datasets. A flow-chart 950 generally depicting the steps taken by the system controller 500 when controlling the valve 630 in the present illustrative scenario is illustrated in FIG. 21.

First, the controller 500 determines whether the snowmobile 10 is being operated near sea-level or nearer to a high altitude. The relative altitude (high or low) is generally determined by the intake pressure sensor 504 by measuring the ambient air pressure entering the air intake system, but in some cases the snowmobile 10 could include an altimeter communicatively connected to the system controller 500 for determining the altitude. The system controller 500 can then retrieve the predetermined datasets of valve position and pressure corresponding to operation of the snowmobile 10 at the relevant altitude range. In order to avoid inaccurate altitude readings by the intake pressure sensor 504 caused by additional pressure created by the turbocharger 300, the altitude-related pressure reading is taken when the RPM and the TPS outputs are below a predetermined level that corresponds to an operating state of the snowmobile 10 where no boost pressure from the turbocharger 300 should be created. It is also noted that datasets corresponding to different altitudes, other than low or high, could be used. Datasets corresponding to more than two altitudes are also contemplated.

Following determination that the snowmobile 10 is either at high or low altitude, the system controller 500 then determines if the valve 630 should be adjusted according to a "coarse" adjustment regime or a "fine" adjustment regime. This determination is performed by comparing an actual boost pressure (the current air intake pressure which is supplemented by the turbocharger 300) with a predetermined desired boost target pressure based on a dataset of TPS vs RPM. The actual boost pressure produced by the turbocharger 300 is determined by the intake pressure sensor 504. A desired boost target pressure for the current TPS and RPM values is determined from a predetermined dataset, an example predetermined desired boost target pressure dataset 975 being shown in FIG. 22. When the actual boost from the turbocharger 300 is within a predetermined range or threshold of the desired boost target (for example within 5, 10, or 15 mbars of the desired boost), the fine regime will be used. Otherwise, the coarse regime will be used. Depending on the specific implementation, the predetermined range could be modified depending on factors such as ambient air temperature, altitude etc. It is further noted that the predetermined range for switching from the coarse regime to the fine regime could, in some cases, be different than the predetermined range for switching from the fine regime to the coarse regime. This hysteresis is introduced into the coarse/fine determination approach to aid in limiting rapid switching between the two control regimes. If the threshold differences for switching between the coarse and fine adjustment regimes were the same, for example, each time the pressure difference is slightly below or above the threshold the method could switch regimes in a rapid alternation between the coarse and fine adjustment regimes. This could be unnecessarily inefficient especially when the pressure difference is oscillating around the threshold value.

When operating in the coarse adjustment regime, also known as a dynamic regime, the back pressure is simultaneously monitored and controlled according to a pressure dataset, in order to ensure that movement of the valve 630 to increase boost pressure does not cause a detrimental increase in back pressure. A sample pair of a valve position dataset 960 and a pressure dataset 970 are illustrated in FIG. 33 (the values are simply illustrative and are not meant to be limiting). In the case where pressure dataset 970 is being used in the coarse regime, the output values will represent a maximum value difference between the exhaust pressure and the intake pressure as will be described in more detail below.

During control of the valve 630, if the back pressure rises above a certain amount for the current operating conditions (e.g. RPM and TPS), the performance of the engine 26 could be negatively affected or at least not optimal. To impede this from happening, the representation of the maximum back pressure as determined in the dataset 970 from the current TPS and RPM values, is compared to the actual back pressure, as determined from the exhaust pressure minus the intake pressure obtained from the exhaust pressure sensor 590 and the intake pressure sensor 504 respectively. If the actual back pressure exceeds the value from the dataset 970, the system controller 500 will apply a correction to the valve position dataset 960 in order to move the valve 630 to a position that maintains the back pressure within an acceptable range, i.e. the actual pressure difference below that obtained from the dataset 970. In some cases a correction factor could be mathematically determined and applied across the dataset 960. For instance, the correction factor could be determined based on the difference between the value retrieved from the dataset 970 and the actual back pressure as determined from the pressures measured by the exhaust and intake pressure sensors 590, 504. Notably, the correction factor could be proportional to the difference between the value retrieved from the dataset 970 and the actual back pressure as determined from the pressures measured by the exhaust and intake pressure sensors 590, 504. In some implementations, rather than determining a correction factor, a different predetermined dataset 960 could be retrieved.

It is to be understood that, in order for the calculation of the actual back pressure to be accurate, the amount of time lapsed between the measurements made by the exhaust pressure sensor 590 and the intake pressure sensor 504 should be kept relatively small such that the measurements are made generally simultaneously. Notably, the pressures at the locations of the sensors 590, 504 can change rapidly and therefore if a significant amount of time is allowed to lapse between the measurement made by the exhaust pressure sensor 590 and the corresponding measurement made by the intake pressure sensor 504, the correction made to the position of the valve 630 may not be very accurate to obtain the desired back pressure. For instance, the exhaust pressure sensor 590 and the intake pressure sensor 504 make corresponding measurements within one revolution of the crankshaft 126 from one another. More specifically, in this embodiment, the exhaust pressure sensor 590 and the intake pressure sensor 504 make corresponding measurements within a tenth of a revolution of the crankshaft 126 from one another. The exhaust pressure sensor 590 and the intake pressure sensor 504 may make corresponding measurements between a tenth of a revolution of the crankshaft 126 and one revolution of the crankshaft 126 from one another, but other frequencies are contemplated.

In the fine adjustment regime, fine adjustment tables, also referred to as static datasets, are used when there is a small difference between the actual boost pressure and the desired boost pressure as mentioned above. In contrast to the approach taken in coarse adjustment, the fine adjustments are made to approach and maintain the optimal intake pressure (boost pressure) into the engine 26. As small adjustments to the position of the valve 630 should not have a drastic effect on the back pressure, during the fine adjustment regime the back pressure may not be continuously monitored, as it is in the coarse regime. As with the coarse regime, the fine regime uses a valve position dataset similar to that of dataset 960, which is based on the actual TPS and RPM values, and a pressure dataset similar to that of 970 also based on the actual TPS and RPM values. The pressure dataset 970, when in the fine regime, includes values that represent only the intake pressure and that are to be compared to the actual intake pressure measure by the intake pressure sensor 504. The difference between the output from the dataset 970, when in the fine regime, and that of the actual intake pressure, will determine a correction factor to be applied to the valve position from dataset 970.

During operation, the system controller 500 continuously reevaluates the altitude and coarse/fine determinations, as there will be changes to the throttle and RPM positions as the snowmobile 10 is operated, which will also change the exhaust and intake pressures as the valve 630 is controlled to improve operation of the engine 26, and/or changes in the altitude at which the snowmobile 10 is being operated as it travels over terrain.

As will be described in detail below, in this embodiment, the system controller 500 also controls the turbocharger 300 based in part on a temperature of exhaust gas flowing within the exhaust pipe 202 in order to optimize engine performance when the temperature of the exhaust gas is low. In other words, the system controller 500 is configured to control the turbocharger 300 to adjust the boost pressure provided thereby to the engine 26 based in part on the temperature of the exhaust gas flowing within the exhaust pipe 202.

Figure 26:
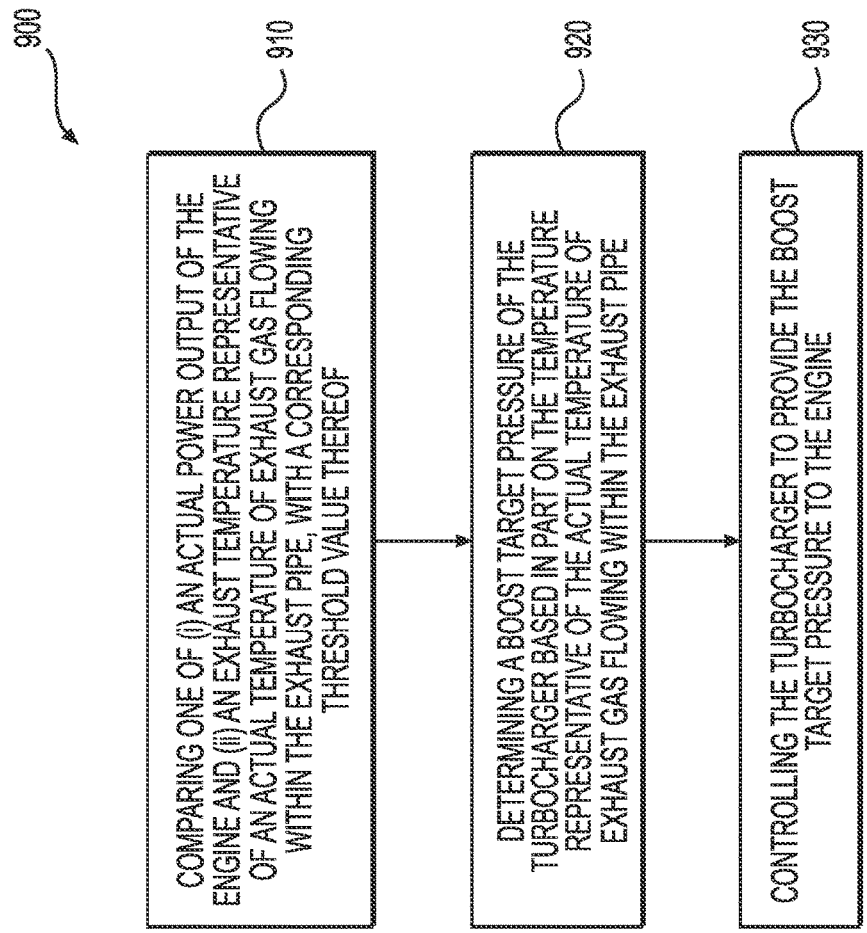
FIG. 26 is a flowchart illustrating a method according to the present technology for controlling the engine.

With reference to FIG. 26, a method 900 performed by the system controller 500 to control the engine 26 based in part on the temperature of the exhaust gas discharged by the engine 26 will now be described.

At step 910, the system controller 500 compares a temperature representative of the actual temperature of exhaust gas flowing within the exhaust pipe 202, as sensed by the temperature sensor 512, with a threshold temperature in order to determine if the temperature of the exhaust gas is considered to be low. In this embodiment, the threshold temperature is less than or equal to 250° C. Notably, the threshold temperature is between 150° C. and 250° C. More specifically, the threshold temperature is approximately 200° C. The threshold temperature may have any other suitable value in other embodiments.

Alternatively, at step 910, the system controller 500 compares an actual power output of the engine 26 with a threshold engine power output in order to determine if the power output of the engine 26 can be considered to be low. The actual power output of the engine 26 can be determined based on a rotational speed of the engine 26, as sensed by the engine sensor 586 (FIG. 8), and the torque output of the engine 26, as sensed by a torque sensor 587 in communication with the system controller 500 (FIG. 8). Notably, the system controller 500 can calculate the actual power output of the engine 26 by multiplying the rotational speed and the torque output of the engine 26. Alternatively or additionally, in some embodiments, a cylinder pressure measured by a cylinder pressure sensor 585 (FIG. 8) connected to one of the cylinders of the engine 26 could be used to obtain the actual power output of the engine 26. Notably, the cylinder pressure measured by the cylinder pressure sensor 585 can be used with the speed of the engine 26 to calculate the actual power output of the engine 26.

When the temperature of the exhaust gas flowing within the exhaust pipe 202 is less than the threshold temperature (or alternatively the actual power output of the engine 26 is less than the threshold engine power output), the method 900 proceeds to step 920 where the system controller 500 determines a boost target pressure of the turbocharger 300 based on the temperature representative of the actual temperature of exhaust gas flowing within the exhaust pipe 202 (i.e., the signal generated by the temperature sensor 512) and the TPS (throttle position) of the throttle valve 39 as sensed by the throttle valve position sensor 588.

More specifically, to determine the boost target pressure of the turbocharger 300, the system controller 500 accesses a predetermined dataset 560 (an example of which is reproduced in FIG. 27) to retrieve a boost target pressure correction factor therefrom. In particular, the predetermined dataset 560 provides a plurality of boost target pressure correction factors corresponding to respective pairings of values of the temperature of the exhaust gas discharged by the engine 26 and the TPS. Thus, the system controller 500 retrieves the appropriate boost target pressure correction factor from the predefined dataset 560 based on the signal generated by the temperature sensor 512 and the TPS of the throttle valve 39 as sensed by the throttle valve position sensor 588.

In this embodiment, the boost target pressure correction factor represents a pressure value that can be added to an actual boost pressure (i.e., the current boost pressure) of the turbocharger 300 in order to compensate for the power loss of the engine 36 due to the low temperature of the exhaust gas discharged thereby. As such, a higher temperature of the exhaust gas corresponds to a smaller boost target pressure correction factor. The boost target pressure correction factor may thus also be referred to as a corrective amount of boost pressure. Alternatively, the boost target pressure correction factor can be added to another predetermined value of a boost target pressure. For example, the boost target pressure correction factor can be added to the boost target pressure value retrieved by system controller 500 from the dataset 975 described above which was determined based on TPS and RPM.

It is contemplated that in alternative embodiments, the boost target pressure correction factor may be a multiplier that is to be applied to the actual boost pressure of the turbocharger 300 to determine the boost target pressure.

Once the boost target pressure correction factor has been determined, it is added to the actual boost pressure provided by the turbocharger (or to another predetermined boost target pressure as described above) to obtain the boost target pressure that the turbocharger 300 should provide to the engine 26 in order to compensate for the low temperature (or low power output).

Next, at step 930, the system 500 controls the turbocharger 300 to provide the boost target pressure to the engine 26. In other words, the system controller 500 proceeds to control the turbocharger 300 in accordance with the boost target pressure correction factor. To that end, the system controller 500 actuates the valve 630 via the actuator 635 to increase the actual boost pressure of the turbocharger 300 in accordance with the boost target pressure correction factor. More specifically, the system controller 500 actuates the valve 630 in order to control the turbocharger 300, thus providing more exhaust gas to the exhaust turbine of the turbocharger 300 for operation thereof. In response to increasing the boost pressure by the boost target pressure correction factor, the temperature of the exhaust gas discharged by the engine 26 increases to or above the threshold temperature and/or the actual power output of the engine 26 increases to or above the threshold engine power output.

As will be understood, the method 900 thus controls the turbocharger 300 to provide additional boost pressure to the engine 26 so as to compensate for the power loss resulting from the low temperature exhaust gas as it begins warming up. Notably, using the turbocharger 300 in this manner is considerably faster than waiting for the exhaust gas to warm up sufficiently to provide the engine 26 with optimal operating conditions. In particular, the delay for the turbocharger 300 to provide the additional boost pressure is simply the turbocharger's spool up time which is significantly faster than the time it would take for the exhaust gas to warm up to optimal operating temperatures without the assistance of the turbocharger 300. For instance, the turbocharger's spool up time can be up to ten times faster or more than the time it would take for the exhaust gas to warm up to optimal operating temperatures without the assistance of the turbocharger 300. In addition, controlling the turbocharger 300 to provide the additional boost pressure to the engine 26 during this warming up period of the exhaust gas also causes an accelerated heating rate of the exhaust gas discharged by the engine 26, thus shortening the amount of the time it takes for the exhaust gas to reach optimal operating temperatures compared to if the turbocharger assistance was not implemented during the warming-up period.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for controlling a two-stroke engine operatively connected to a turbocharger, the turbocharger being in fluid communication with the engine to provide a boost pressure thereto, the method comprising:
   determining an exhaust temperature representative of an actual temperature of exhaust gas being discharged by the engine;
   determining a temperature difference between the exhaust temperature and a threshold temperature;
   determining an actual power output of the engine,
   in response to the exhaust temperature being less than the corresponding threshold value:
      determining a corrective amount of boost pressure to add to the boost pressure of the turbocharger, the corrective amount of boost pressure being determined based on the temperature difference,
      the corrective amount of boost pressure being further determined based on:
         comparing the actual power output of the engine and a corresponding power output threshold value thereof,
         accessing a predefined dataset, and
         retrieving the corrective amount of boost pressure from the predefined dataset based on the exhaust temperature and a throttle position of a throttle valve regulating air flow into the engine; and
      controlling the turbocharger to increase the boost pressure of the turbocharger by the corrective amount.

2. The method of claim 1, wherein determining the corrective amount of boost pressure comprising selecting a magnitude of the corrective amount of boost pressure corresponding to a magnitude of the temperature difference, with greater magnitudes of boost pressure being chosen in response to greater temperature differences.

3. The method of claim 1, wherein controlling the turbocharger to increase the boost pressure of the turbocharger by the corrective amount increases the actual power output to or above the corresponding power output threshold value.

4. The method of claim 1, wherein determining the actual power output of the engine comprises:
   determining a rotational speed of the engine;
   determining a torque output of the engine; and
   calculating the actual power output of the engine based at least in part on the rotational speed of the engine and the torque output of the engine.

5. The method of claim 1, wherein controlling the turbocharger to increase the boost pressure of the turbocharger comprises:
   actuating a valve disposed in a conduit of an exhaust system fluidly connected to the engine based at least in part on the corrective amount of boost pressure, the valve being configured to selectively divert exhaust gas away from the turbocharger.

6. The method of claim 1, wherein determining the exhaust temperature comprises sensing a temperature within an exhaust pipe of the engine.

7. The method of claim 1, wherein determining the exhaust temperature comprises sensing a temperature of a surface of an exhaust pipe of the engine.

8. The method of claim 1, wherein the corresponding threshold value of the exhaust temperature is less than or equal to 250° C.

9. The method of claim 8, wherein the corresponding threshold value of the exhaust temperature is between 150° C. and 250° C. inclusively.

10. The method of claim 9, wherein the corresponding threshold value of the exhaust temperature is approximately 200° C.

11. A method for controlling a two-stroke engine operatively connected to a turbocharger, the turbocharger being in fluid communication with the engine to provide a boost pressure thereto, the method comprising:
   determining an exhaust temperature representative of an actual temperature of exhaust gas being discharged by the engine;
   determining an actual power output of the engine; and
   in response to the exhaust temperature being less than a corresponding threshold value by a first value:
      controlling the turbocharger to increase the boost pressure of the turbocharger by a first amount which would cause the engine to output a threshold engine power output;
   in response to the exhaust temperature being less than a corresponding threshold value by a second value, the second value being greater than the first value:
      controlling the turbocharger to increase the boost pressure of the turbocharger by a second amount, greater than the first amount, which would cause the engine to output the threshold engine power output,
   at least one of the first amount of boost pressure and the second amount of boost pressure being determined based on:
      comparing the actual power output of the engine and the corresponding threshold engine power output thereof;
      accessing a predefined dataset; and
      retrieving a corrective amount of boost pressure from the predefined dataset based on the exhaust temperature and a throttle position of a throttle valve regulating air flow into the engine.

12. The method of claim 11, further comprising:
   determining an actual power output of the engine,
   wherein a corrective amount of boost pressure is further determined based on a comparison of the actual power output of the engine and the corresponding threshold engine power output thereof.

13. The method of claim 12, wherein determining the actual power output of the engine comprises:
   determining a rotational speed of the engine;
   determining a torque output of the engine; and
   calculating the actual power output of the engine based at least in part on the rotational speed of the engine and the torque output of the engine.

14. The method of claim 11, wherein controlling the turbocharger to increase the boost pressure of the turbocharger comprises:
    actuating a valve disposed in a conduit of an exhaust system fluidly connected to the engine based at least in part on the corrective amount, the valve being configured to selectively divert exhaust gas away from the turbocharger.

15. The method of claim 11, wherein determining the exhaust temperature comprises sensing a temperature within an exhaust pipe of the engine.

16. The method of claim 11, wherein determining the exhaust temperature comprises sensing a temperature of a surface of an exhaust pipe of the engine.

\* \* \* \* \*